United States Patent [19]
Hiraiwa

[11] Patent Number: 5,695,033
[45] Date of Patent: Dec. 9, 1997

[54] SYNCHRONIZING APPARATUS FOR TRANSMISSION

[75] Inventor: Kazuyoshi Hiraiwa, Yokohama, Japan

[73] Assignee: Kyowa Metal Works Co., Ltd., Yokohama, Japan

[21] Appl. No.: 628,295

[22] Filed: Apr. 5, 1996

[30] Foreign Application Priority Data

Jul. 20, 1995 [JP] Japan .................. 7-183698

[51] Int. Cl.⁶ .................................................. F16D 23/06
[52] U.S. Cl. .................................. 192/53.32; 192/53.34; 192/53.362; 74/339
[58] Field of Search .................. 192/53.3, 53.32, 192/53.34, 53.341, 53.362; 74/339

[56] References Cited

U.S. PATENT DOCUMENTS

| | | | |
|---|---|---|---|
| 1,901,713 | 3/1933 | Vincent | 192/53.362 |
| 4,526,052 | 7/1985 | Hiraiwa | 192/53.34 X |
| 4,572,020 | 2/1986 | Katayama | 74/339 X |
| 4,674,346 | 6/1987 | Hiraiwa | 74/339 |
| 4,823,631 | 4/1989 | Kishimoto | 192/53.32 X |

*Primary Examiner*—Richard M. Lorence
*Attorney, Agent, or Firm*—Wenderoth Lind & Ponack

[57] ABSTRACT

A booster mechanism is interposed between a hub of a Warner type synchronizing apparatus and a synchronizing ring to boost and transmit a pressure force caused by the movement of a coupling sleeve to a speed change gear side. There is also provided a rearward synchronizing mechanism for stopping the rotation of a drive shaft in such a manner that when the rearward synchronizing mechanism receives a pressure force caused by the reverse shift of the sleeve, it reverses and transmits the pressure force to the synchronizing ring for a synchronizing action, in addition to the booster mechanism on the forward speed change gear.

5 Claims, 14 Drawing Sheets

SYNCHRONIZING APPARATUS FOR TRANSMISSION

BACKGROUND OF THE INVENTION

1. Field of the Invention

The present invention relates to a synchronizing apparatus for an automobile transmission, and more specifically, to a Warner type synchronizing apparatus for improving a synchronizing performance.

2. Description of the Related Art

There is known, for example, a Warner type synchronizing apparatus as a synchronizing apparatus used to an automobile transmission. As is well known, the Warner type synchronizing apparatus is arranged such that a chamfer surface formed to the outer periphery of a synchronizing ring is pressed by a chamfer surface formed to the spline of a sleeve, so that a synchronizing action is executed to eliminate a rotational difference between the sleeve and a speed change gear by the friction between the inner peripheral conical surface of the synchronizing ring and the outer peripheral conical surface of the speed change gear. The synchronizing action permits the spline of the sleeve to be smoothly meshed with the clutch gear of the speed change gear. That is, in the Warner type synchronizing apparatus, when movement of the sleeve is started by moving a shift fork, a key is moved together with the sleeve and abutted against the groove of the synchronizing ring and presses it. Then, the synchronizing ring is pressed against the outer peripheral conical surface of the speed change gear and the speed change gear starts synchronization by the friction of its outer peripheral conical surface. When the projection of the key is removed from the groove of the inner surface of the sleeve and the sleeve further moves, the chamfer at the extreme end of the spline of the inner surface of the sleeve is abutted against the extreme end of the spline of the synchronizing ring, so that the movement of the sleeve is checked by the synchronizing ring. Thus, the synchronizing ring is strongly pressed by the sleeve and thus pressed against the conical inner surface to thereby generate a large frictional force. With this operation, synchronization of the sleeve with the speed change gear is proceeded. When synchronization is completed as described above and there is no difference of relative speed between the sleeve and the speed change gear, frictional torque disappears, the synchronizing ring is permitted to rotate, the sleeve passes through the synchronizing ring and meshes with the clutch gear of the speed change gear to thereby complete the speed change.

In the conventional synchronizing apparatus arranged as described above, however, the force for pressing the synchronizing ring against the outer peripheral conical surface of the speed change gear is a force same as a pressure force acting from the shift fork of an operation mechanism to the sleeve. Therefore, there is a problem in that an increase of a synchronizing capability requires such a complex arrangement as an increase of the diameter of a conical surface, an increase of the number of the conical surface, and the like, thus it is difficult to increase the synchronizing capability by a simple arrangement. Further, it is known in a forward five-speed/rearward one-speed transmission that when a sleeve for a fifth speed gear is moved to a direction opposite to the fifth speed gear (rearward change gear direction), if the rotation of a drive shaft can be stopped by being synchronized with the fifth speed gear, a reverse gear noise can be prevented in a shift operation. However, the conventional synchronizing apparatus has a problem that it is difficult to achieve synchronization by moving the sleeve in the opposite direction.

SUMMARY OF THE INVENTION

According to the present invention, there is provided a synchronizing apparatus for a transmission capable of greatly increasing a synchronizing capability by a simple arrangement.

The synchronizing apparatus for a transmission of the present invention comprises an output shaft for outputting rotational power, a hub secured to the output shaft and having a spline formed to the outer periphery thereof, a sleeve slidable in an axial direction by inserting a spline formed to the inner periphery thereof to the outer peripheral spline of the hub, a speed change gear pivotally mounted on the output shaft, forming an outer peripheral conical surface on the hub side and having a clutch gear integrally formed therewith continuous to the outer peripheral conical surface, the clutch gear being meshed with the inner periphery spline of the sleeve by the axial movement thereof, and a synchronizing ring having an inner peripheral conical surface confronting the outer peripheral conical surface of the speed change gear and interposed between the sleeve and the outer peripheral conical surface. With respect to the synchronizing apparatus arranged as described above, the present invention is characterized in that a booster mechanism, which is interposed between the hub and the synchronizing ring, receives a pressure force caused by the movement of the sleeve toward the speed change gear and boosts and transmits the pressure force to the synchronizing ring.

The booster mechanism includes a pair of fulcrum projections serving as fulcrums which project to at least two symmetrical positions of the end surface of the synchronizing ring on the hub side thereof. A pair of levers divided into at least two sections in a peripheral direction are disposed on both the sides of the pair of the fulcrum projections through a certain clearance to the fulcrum projections. The pair of the levers are pressed and expanded in a radial direction. Lever heads project to the centers of the outer peripheries of the pair of the levers. Each of the lever heads has a taper edge forming an effort receiving an axial pressure force caused by the movement of the sleeve and decomposing the pressure force to a radial component force toward a center and an axial component force. Further, a projection for point of application is formed to each of the pair of the levers and creates a point of application where the axial component force made by pressing the effort of the lever head is boosted and transmitted to a predetermined position of the end surface of the synchronizing ring. The booster mechanism can press the synchronizing ring by boosting a pressure force caused by the sleeve by (L1/L2) times by setting a distance L2 from the fulcrum to the point of application shorter than a distance L1 from the fulcrum to the effort. The booster mechanism sets an angle of the taper edge such that when the inner peripheral conical surface of the synchronizing ring comes into frictional contact with the outer peripheral conical surface of the speed change gear, a reaction force applied from the fulcrum projections to the end surface of each of the levers overcomes a radial component force made by pressing the taper edges of the lever heads provided with a pair of arms. As a result, even if the fulcrum positions of the levers are pressed, they does not move in a radial direction and can securely transmit the boosted pressure force to the synchronizing ring. As a modification of the booster mechanism, a plurality of triangular fulcrum projections each having an apex located on an outer peripheral side may project from a plurality of symmetrical positions of the end surface of the synchronizing ring on the hub side thereof and a plurality of levers each having a triangular hole may be engaged with each of the fulcrum projections and disposed to a ring shape. A double synchronizing cone structure including a cone interposed between a synchronizing outer ring and a synchronizing inner ring may be provided as the synchronizing ring. In this case, the booster mechanism includes a plurality of fulcrum projections serving as fulcrums which project to at least two symmetrical positions of the end surface of each of the synchronizing outer ring and the synchronizing inner ring on the hub side thereof and each of the pair of levers include a projection for point of application creating a point of application where the axial component force made by pressing the effort of the lever head is boosted and transmitted to a predetermined position of the end surface of the synchronizing outer ring.

According to the present invention, there is provided a synchronizing apparatus for a forward five speed/rearward one speed transmission in which even if a sleeve is moved to a side opposite to a fifth speed gear in shift operation to a reverse gear, the fifth speed gear can be synchronized and gear noise can be prevented in the operation to the reverse gear.

Also in this case, a subject of the present invention is a synchronizing apparatus for transmission which comprises a drive shaft to which rotational power is input, a hub secured to the drive shaft and having a spline formed to the outer periphery thereof, a sleeve slidable in an axial direction by inserting a spline formed to the inner periphery thereof to the outer peripheral spline of the hub, a forward speed change gear pivotally mounted on the output shaft on one side thereof with respect to the hub, forming an outer peripheral conical surface on the hub side and having a clutch gear integrally formed therewith continuous to the outer peripheral conical surface, the clutch gear being meshed with the inner periphery spline of the sleeve by the axial movement thereof, and a synchronizing ring having an inner peripheral conical surface confronting the outer peripheral conical surface of the forward speed change gear and interposed between the sleeve and the outer peripheral conical surface.

In the synchronizing apparatus arranged as described above, the present invention has a booster mechanism interposed between the hub and the synchronizing apparatus ring, the booster mechanism boosting and transmitting a pressure force received by it, which is caused by the movement of the sleeve to the forward speed change gear, to the synchronizing ring. Further, the booster mechanism also serves as a rearward synchronizing mechanism for stopping the rotation of the drive shaft by a synchronizing action executed in such a manner that when the rearward synchronizing mechanism receives a pressure force caused by the movement of the sleeve to a side opposite to the forward speed change gear, the rearward synchronizing mechanism reverses and transmits the pressure force to the synchronizing ring.

The booster mechanism includes a pair of first fulcrum projections serving as first fulcrums projecting to at least two symmetrical positions of the end surface of the synchronizing ring on the hub side thereof. A pair of levers divided into at least two sections in a peripheral direction are disposed to a ring shape on both the sides of the first fulcrum projections through a certain clearance to the fulcrum projections. The pair of the levers are pressed and expanded in a radial direction by a spring. Lever heads project to the centers of the outer peripheries of the pair of the levers. Each of the lever heads has a first taper edge formed thereto which creates an first effort for receiving an axial pressure force caused by the movement of the sleeve to the forward speed change gear and decomposing the pressure force to a radial component force toward a center and an axial component force. Further, each of the pair of the levers is provided with a first projection for point of application for creating a first point of application where the axial component force made by pressing the first effort of the lever head is boosted and transmitted to a predetermined position of the end surface of the synchronizing ring. The booster mechanism can press the synchronizing ring by boosting a pressure force caused by the sleeve by (L1/L2) times by setting a distance L2 from the first fulcrum to the first point of application shorter than a distance L1 from the first fulcrum to the first effort. The booster mechanism sets an angle of the first taper edge such that when the inner peripheral conical surface of the synchronizing ring comes into frictional contact with the outer peripheral conical surface of the speed change gear, a reaction force applied from the first fulcrum projections to the end surface of each of the levers overcomes a radial component force made by pressing the first taper edges of the arm heads provided with a pair of ring arms. As a result, even if the first fulcrum positions of the levers are pressed in the radial direction, they do not move and can securely transmit the boosted pressure force to the synchronizing ring. The rearward synchronizing mechanism includes a second taper edge formed to the edge of the lever head on the forward speed change gear side thereof and forming a second effort for receiving a pressure force caused by the movement of the sleeve to a side opposite to the forward speed changing gear. Further, the rearward synchronizing mechanism includes a second fulcrum projection formed to the end surface of the hub for creating a second fulcrum which reverses and transmits an axial pressure force applied to the second effort of the second taper edge from the second point of application of the end of each of the levers to the synchronizing ring. In the rearward synchronizing mechanism, respective distances L3, L4 from the second fulcrum to the second effort and from the second fulcrum to the second point of application are set approximately equal to each other.

The above and other objects, features, and advantages of the present invention will become more apparent from the following detailed description with reference to the drawings.

DETAILED DESCRIPTION OF THE INVENTION

Figure 1:
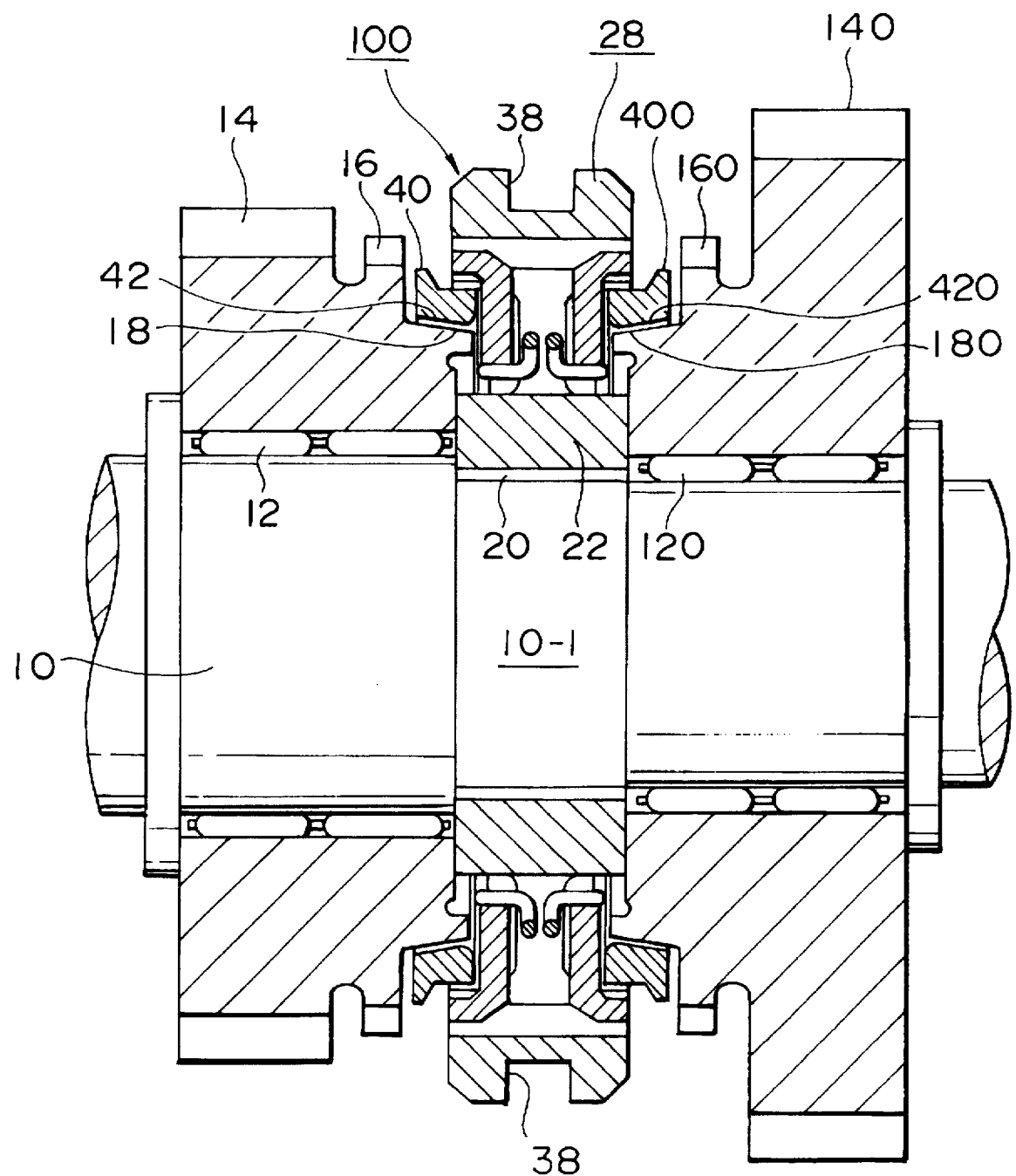
FIG. 1 is a cross sectional view of a synchronizing apparatus equipped with a booster mechanism of the present invention using a low speed gear and a second speed gear as an example.

FIG. 1 is a cross sectional view of a synchronizing apparatus of the present invention equipped with a booster mechanism. In FIG. 1, a low speed gear 140 and a second speed gear 14 are rotatably disposed to an output shaft 10 through bearings 120, 12 and a synchronizing apparatus 100 is interposed therebetween. Rotational power is input to the low speed gear 140 and the second speed gear 14 from an engine through a clutch via an idler gear not shown. A spline shaft 10-1 is interposed between the second speed gear 14 and the low speed gear 140 and a hub 22 of the synchronizing apparatus is engaged with and secured to the spline shaft 10-1 through an inner peripheral spline 20. The hub 22 has an outer peripheral spline 26 formed to the outer periphery thereof. A sleeve 28 has an inner peripheral spline 30 axially movably engaged with the outer peripheral spline 26 of the hub 22. The sleeve 28 has a fork groove 38 formed on the outer periphery thereof. A clutch gear 16 is formed to the second speed gear 14 integrally therewith on the sleeve 28 side thereof to enable the inner peripheral spline 30 on the inner periphery of the sleeve 28 to mesh with the clutch gear 16. An outer peripheral conical surface 18 is disposed adjacent continuously to the clutch gear 16. A synchronizing ring 40 having an inner peripheral conical surface 42 is disposed adjacent to the portion of the outer peripheral conical surface 18. A clutch gear 160 is also integrally formed with the second speed gear 140 on the sleeve 28 side thereof to enable the inner peripheral spline 30 on the inner periphery of the sleeve 28 to mesh therewith. An outer peripheral conical surface 180 is disposed continuous to the clutch gear 160. A synchronizing ring 400 having an inner peripheral conical surface 420 is disposed adjacent to the portion of the outer peripheral conical surface 180. Further, in the present invention, the booster mechanism is interposed between the synchronizing rings 40, 400 and the hub 22.

Figure 2:
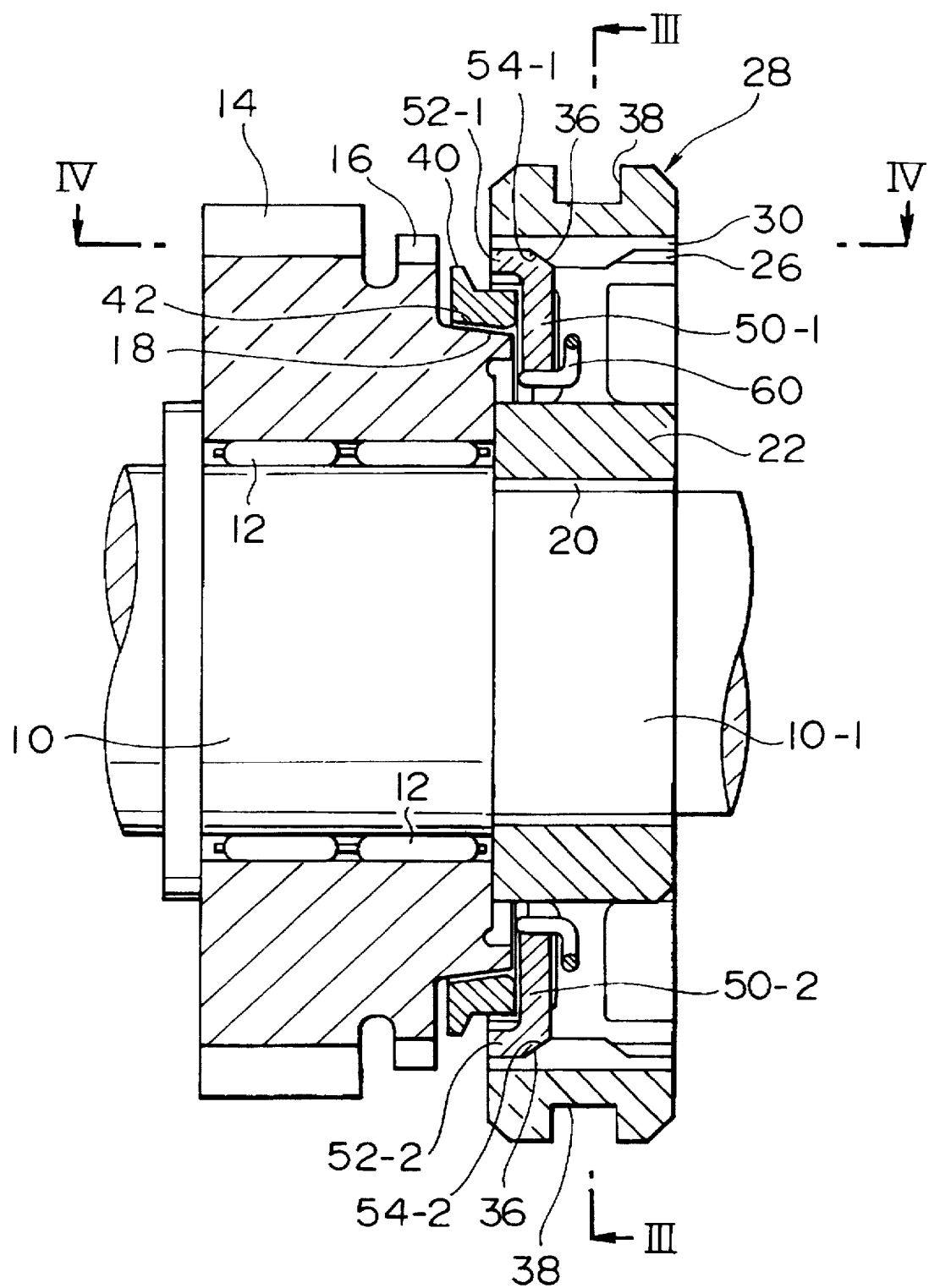
FIG. 2 is a cross sectional view of the synchronizing apparatus of the present invention in which the second speed gear side of FIG. 1 is taken out.

FIG. 2 shows the synchronizing apparatus on the second speed gear 14 side taken out from FIG. 1. Although the second speed gear 14 side will be described as an example in the following description, the low speed gear 140 side is arranged similarly to the second speed gear 14 side. A pair of levers 50-1 and lever 50-2 constituting the booster mechanism is interposed between the synchronizing ring 40 and the hub 22. How the levers 50-1, 50-2 constituting the booster mechanism is assembled to the hub 22 is apparent from FIG. 3, which is a cross sectional view taken along the line III—III of FIG. 2. Note, the sleeve 28 is not shown in FIG. 3.

Figure 3:
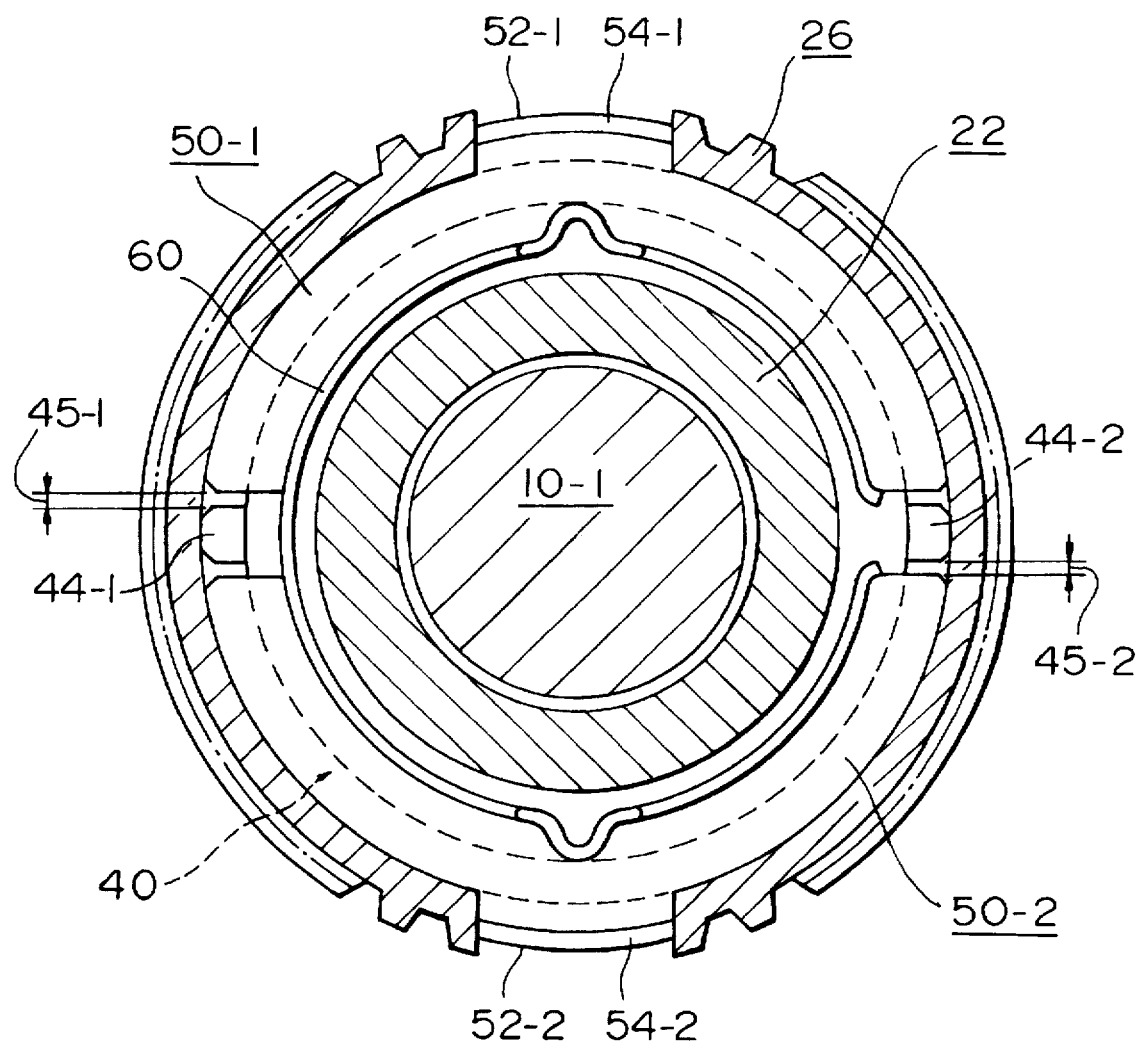
FIG. 3 is a cross sectional view taken along the line III—III of FIG. 2 without a sleeve.

In FIG. 3, the levers 50-1, 50-2, each formed in a horseshoe-shape by being divided into two sections in a peripheral direction, are assembled to the recess of a rib between the boss side of the hub 22 and the outer peripheral spline 26. The levers 50-1, 50-2 have lever heads 52-1, 52-2 at the centers on the outer peripheries thereof and formed integrally therewith. Both the ends of the levers 50-1, 50-2 are disposed by being spaced apart from each other a certain interval and block-shaped fulcrum projections 44-1, 44-2 projecting from the end surface of the synchronizing ring 40 disposed on the second speed gear 14 side are disposed to the spaces therebetween. A ring-shaped spring 60 a part of which is cut out is assembled to the inner side of the levers 52-1, 52-2 to thereby press and expand the levers 50-1, 50-2 in a radial direction. In the state that the spring 60 is assembled as described above, certain clearances 45-1, 45-2 are formed between the fulcrum projections 44-1, 44-2 and both the ends of the levers 50-1, 50-2.

As apparent from the cross sectional view of FIG. 2, the lever heads 52-1, 52-2 of the levers 50-1, 50-2 has an L-shaped cross section having an extreme end extending toward the second speed gear 14 side and taper edges 54-1, 54-2 formed to the edges on the sleeve 28 side thereof. A taper surface 36 formed to the left side of the inner peripheral spline 30 of the sleeve 28 is in contact with the taper edges 54-1, 54-2. The relationship of the inner peripheral spline 30 of the sleeve 28, the clutch gear 16 of a coupling gear and the synchronizing ring 40 to the lever head 52-1 is apparent from FIG. 4 which is a view obtained by extending the cross section taken along the line IV—IV of FIG. 2.

Figure 4:
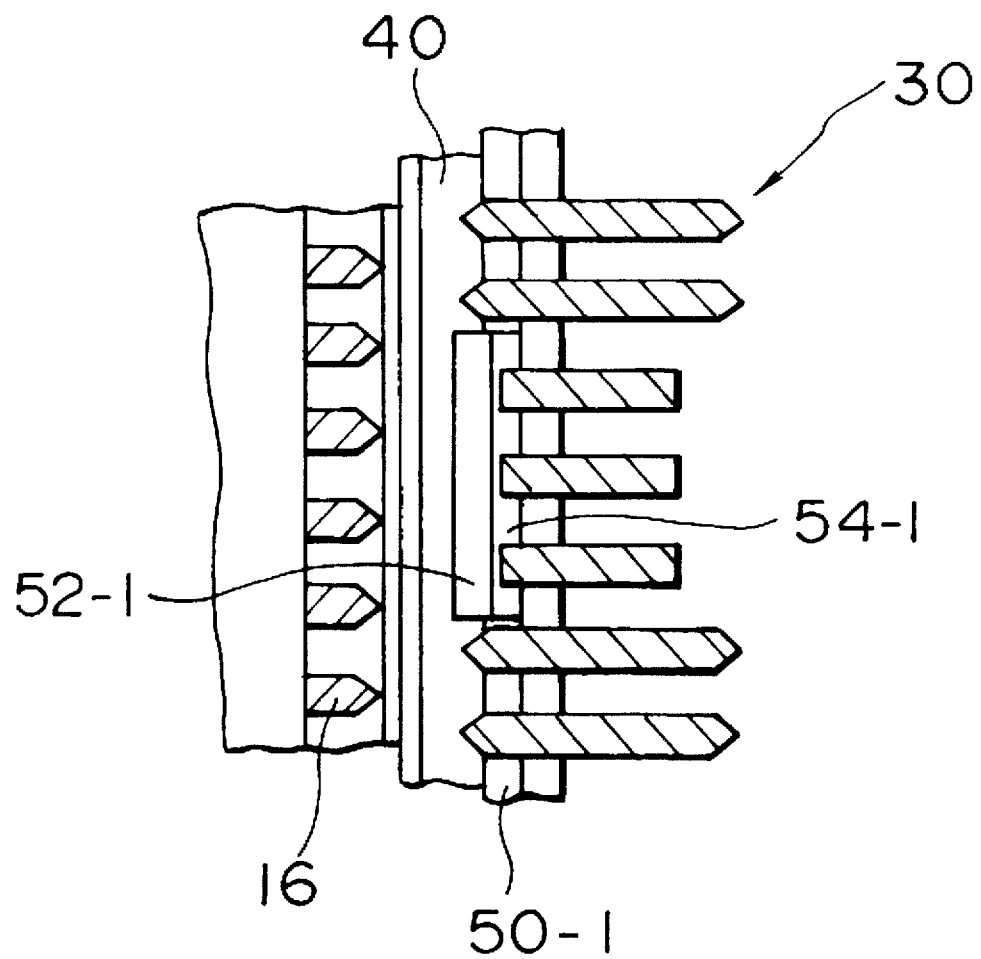
FIG. 4 is an expanded cross sectional view taken along the line IV—IV of FIG. 2 without a hub viewed from the outside.

In FIG. 4, the inner peripheral spline 30 of the sleeve 28 is cut out at the position of the lever 50-1 from which the head 52-1 projects and forms a taper surface confronting the taper position 54-1 of the lever head 52-1. Thus, when the sleeve 28 is moved to the clutch gear 16 side by operating a shift fork, the taper position 54-1 of the lever head 52-1 is pressed by the taper surface 36 formed by cutting out the inner peripheral spline 30 (refer to FIG. 2). Therefore, the lever head 52-1 forms an effort where a pressure force is applied by the movement of the sleeve 28.

Figure 5:
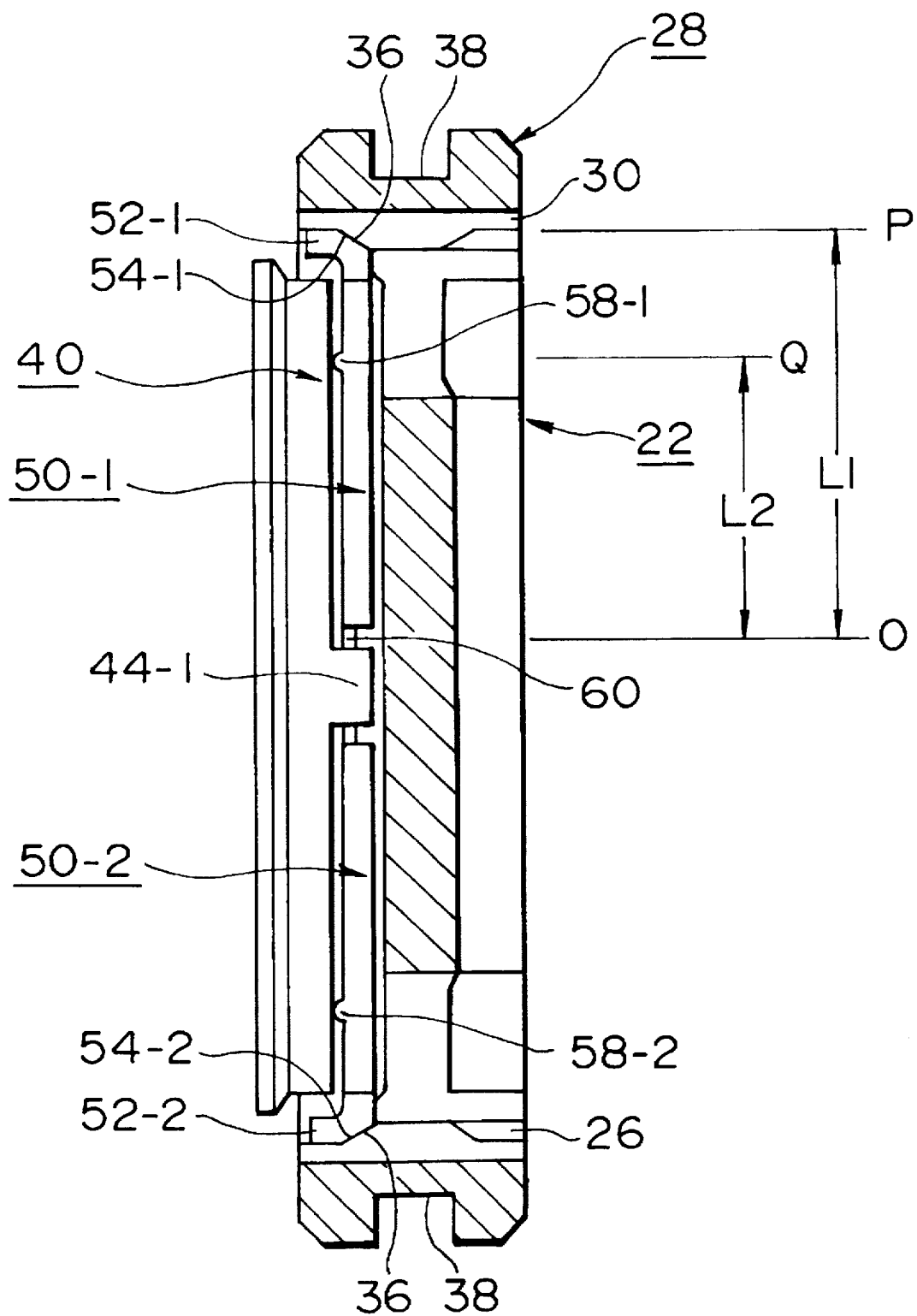
FIG. 5 is a view explaining the relationship between a synchronizing ring and a lever.

FIG. 5 is a view partly in cross section of an outside view of the synchronizing ring 40 on the second speed gear 14 side, and the hub 22 and the sleeve 28 shown in FIG. 2. The synchronizing ring 40 has the fulcrum projection 44-1 extending from the end surface thereof toward the hub 22 side. As apparent from FIG. 3, the fulcrum projection 44-2 is located on the opposite side of the fulcrum projection 44-1. The levers 50-1, 50-2 are disposed above and below the fulcrum projection 44-1 and pressed and expanded in the radial direction by the spring 60 disposed to the inside thereof. The lever heads 52-1, 52-2 projecting from the levers 50-1, 50-2 have the taper edges 54-1, 54-2 which confront the taper surface 36 formed to the inner peripheral spline 30 of the sleeve 28. Further, fulcrum projections 58-1, 58-2 are formed to the end surfaces of the levers 50-1, 50-2 confronting the synchronizing ring 40 and the levers 50-1, 50-2 are abutted against the end surface of the synchronizing ring 40 through the fulcrum projections 58-1, 58-2. The fulcrum projections 58-1, 58-2 form points of application when the synchronizing ring 40 is pressed by the levers 50-1, 50-2. When it is supposed that the taper portions 54-1, 54-2 of the levers 50-1, 50-2 serve as efforts and the projections of point of application 58-1, 58-2 serve as points of application, the positions of fulcrum are the positions of the levers 50-1, 50-2 where they are in contact with the fulcrum projections 44-1, 44-2 of the synchronizing ring 40. That is, when synchronization is started by frictional contact caused by the synchronizing ring 40 which is pressed by the movement of the sleeve 28 through the levers 50-1, 50-2 as the booster mechanism, the lower left end of the upper lever 50-1 is abutted against, for example, the fulcrum projection 44-1 of FIG. 3 by frictional contact caused by the inner peripheral conical surface 42 of the synchronizing ring 40 pressed against the outer peripheral conical surface 18 of the second speed gear 14. At the same time, the upper right end of the lower lever 50-2 is abutted against the fulcrum projection 44-2, so that fulcrums are formed by the abutment of the respective ends of the levers 50-1, 50-2 against the fulcrum projections 44-1, 44-2.

Description will be made by taking the lever 50-1 as an example with reference to FIG. 5 again. When a fulcrum position formed by the abutment of the end the lever 50-1 against the fulcrum projection 44-1 of the synchronizing ring 40 is represented by O, a position of application where a pressure force is applied to the taper edge 54-1 of the lever head 52-1 by the movement of the sleeve 28 is represented by P, and the position of the projection of point of application 58-1 formed to the end surface of the lever 50-1 is represented by Q, a distance from the fulcrum O to the effort P is set to L1 and a distance from the point of application Q to the fulcrum O is set to a shorter distance L2. When an axial pressure force applied to the effort P is represented by Fin, an axial pressure force applied from the point of application Q to the synchronizing ring 40 is represented by Fout, the following relation is established from the relationship between the fulcrum O, the effort P and the point of application Q in the lever 50-1.

$$Fin \times L1 = Four \times L2 \quad (1)$$

Therefore, the force Four applied to the point of application Q is represented as follows.

$$Four = Fin \times (L1/L2) \quad (2)$$

Since L1>L2 here, (L1/L2) is a value exceeding 1, thus the synchronizing ring 40 can be pressed by the force Four which is obtained by boosting the pressure force Fin resulting from the movement of the sleeve 28 to (L1/L2) times.

On the other hand, when the axial pressure force Fin is applied to the effort P of the lever head 52-1 by moving the sleeve 28, this force is simultaneously decomposed to an axial force and a radial force toward a center. As a result, the lever 50-1 presses the fulcrum projection 44-1 of the synchronizing ring 40 by the end thereof. At that time, if the synchronizing ring 40 is moved by the pressure force of the lever 50-1, the axial component force at the taper edge 54-1 is greatly reduced and the function of the booster mechanism is lost. Therefore, a reaction force resulting from the frictional contact of the synchronizing ring 40 must overcome the pressure force for pressing the fulcrum projection 44-1 of the lever 50-1 by the movement of the sleeve 28. Consequently, in the present invention, an angle of the taper edge 52-1 is set such that the reaction force applied to the fulcrum projection 44-1 of the synchronizing ring 40 by the frictional contact caused by a synchronizing action overcomes the component force pressing the lever 50-1 in the radial direction by the movement of the sleeve 28.

Next, operation of the embodiment shown in FIG. 2–FIG. 5 will be described. In FIG. 2, a shift fork (not shown) is inserted into the fork groove 38 formed in the outer periphery of the sleeve 28 and a gear-shift to the second speed gear is executed by pressing the sleeve 28 to the left by the action of the shift fork executed in a shift operation. With the movement of the sleeve 28 to the left, the taper surface 36 of the inner peripheral spline 30 of the sleeve 28 is abutted against the taper edges 54-1, 54-2 of the levers 50-1, 50-2 first and the synchronizing ring 40 is pressed by pressing the levers 50-1, 50-2 to the left. As a result, the inner peripheral conical surface 42 of the synchronizing ring 40 comes into contact with the outer peripheral conical surface 18 of the second speed gear 14 whose rotational speed is different from that of the hub 22 and the second speed gear 14 starts to be synchronized by being in contact with the synchronizing ring 40. At the start of the synchronization of the second speed gear 14 caused by the frictional contact, the synchronizing ring 40 rotates relative to the levers 50-1, 50-2 located adjacent to the fulcrum projections 44-1, 44-2 through the clearances 45-1, 45-2 at an initial state as shown in FIG. 2 and is abutted against the fulcrum projections 44-1, 44-2. A link relationship between the fulcrum O, the effort P, and the point of application Q is established in, for example, the lever 50-1 shown in FIG. 4 in this state and the synchronizing ring 40 is strongly pressed by being applied with a pressure force boosted according to the above formula (2). At the same time, a reaction force (torque) caused by the frictional contact of the synchronizing ring 40 overcomes a force for pressing the lever 50-1 to the inside in the radial direction by the pressure force of the sleeve 28 and thus the fulcrum projection 44-1 does not move. Consequently, the pressure force of the sleeve 28 can be boosted as it is and transmitted to the synchronizing ring 40. When the synchronizing ring 40 is pressed by the boost action and the rotation of the synchronizing ring 40 perfectly coincides with the rotation of the second speed gear 14, since frictional torque disappears, there is no force for pressing and returning the levers 50-1, 50-2 through the fulcrum projections 44-1, 44-2 of the synchronizing ring 40. Thus, the taper surface 36 of the sleeve 28 forcibly inserts the levers 50-1, 50-2 inside against the spring 60 so as to be smoothly meshed with the clutch gear 16. The forcible insertion of the levers 50-1, 50-2 to the inside executed by the taper surface 36 of the inner peripheral spline 30 permits the synchronizing ring 40 to rotate toward its original position by the clearances 45-1, 45-1 at the initial state of FIG. 2 so that the synchronizing ring 40 returns to its original state again when the shift operation is completed.

Figure 6:
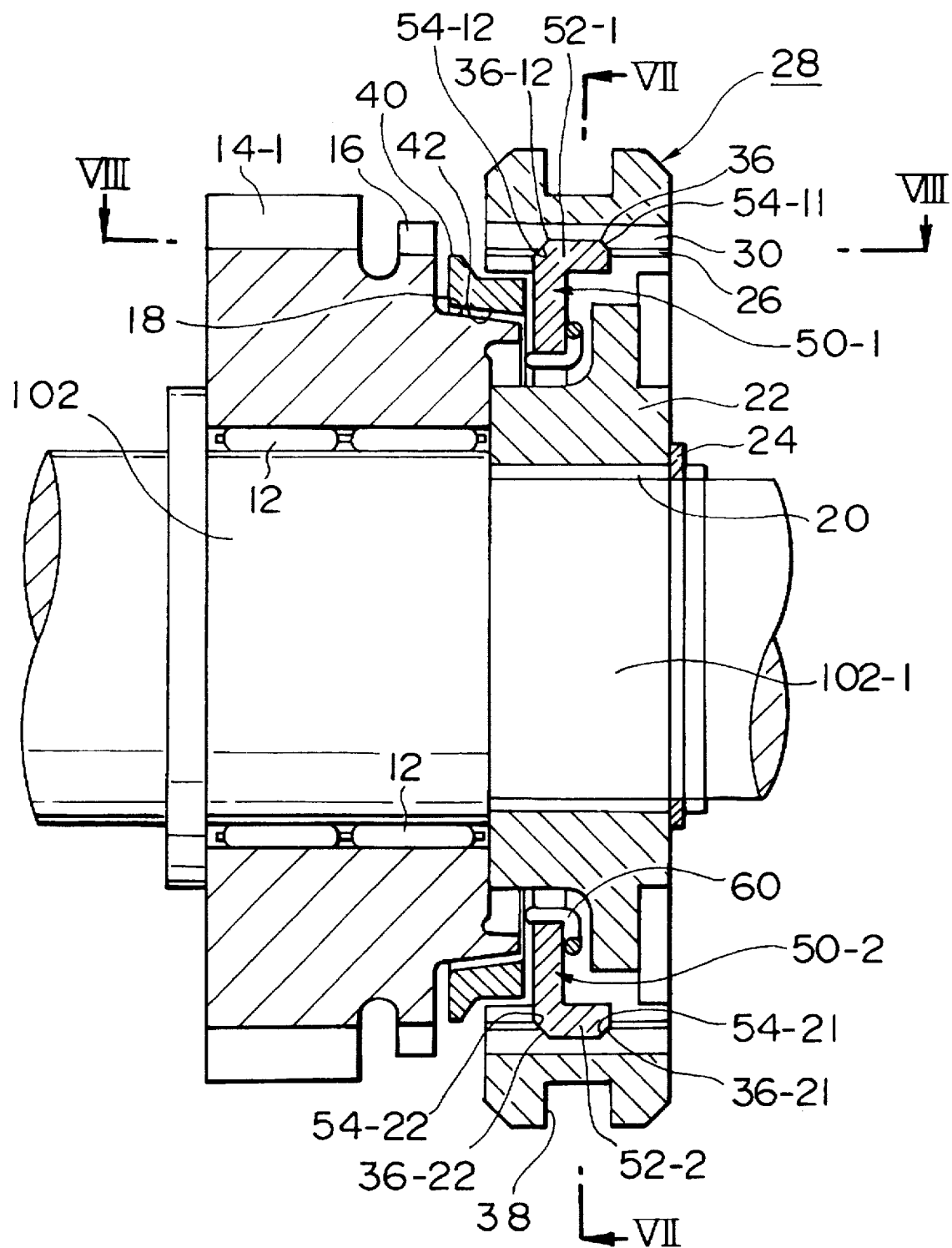
FIG. 6 is a cross sectional view of a synchronizing apparatus of the present invention equipped with a booster mechanism and a rearward synchronizing mechanism.

FIG. 6 shows another embodiment of the present invention which is characterized by a forward five-speed/rearward one-speed transmission including a fifth speed gear synchronizing apparatus equipped with a booster mechanism and a rearward synchronizing mechanism for causing a sleeve to be synchronized with a fifth speed gear when gear shift operation is executed to a reverse gear in which the sleeve is moved to a side opposite to the fifth speed gear.

In FIG. 6, a fifth speed gear 14-1 is rotatably mounted to a drive shaft 102 through a bearing 12. Following the fifth speed gear 14-1, a hub 22 of the synchronizing apparatus is engaged with and secured to a spline shaft 102-1 by a spline 20 and the removal of the hub 22 is prevented by a snap ring 24. Power from an engine is input to the drive shaft 102 through a clutch and the fifth speed gear 14-1 is meshed with a fifth speed driven gear coupled with an output shaft (not shown). Further, a reverse drive gear is coupled with the output shaft and a reverse driven gear is disposed to the reverse drive gear through a reverse idler gear which can be removably secured by a reverse shift. When the reverse shift is executed to a side opposite to a fifth speed shift, the reverse idler gear is moved between the reverse drive gear and the reverse driven gear to thereby mesh them with each other, so that reverse rotation is transmitted to the output shaft. For example, a transmission Model F50A made by Nissan Motors Co. is known as the transmission in which a reverse shift is executed to a side opposite to a fifth speed shift as described above.

The synchronizing mechanism of the fifth speed gear 14-1 is basically the same as that of the embodiment shown in FIG. 2. That is, the inner peripheral spline 36 of a sleeve 28 equipped with a fork groove 38 is axially movably inserted into the outer peripheral spline 26 of a hub 22. A clutch gear 16 is integrally formed with the fifth speed gear 14 and an outer peripheral conical surface 18 is formed continuous to the clutch gear 16. A synchronizing ring 40 having an inner peripheral conical surface 42 is disposed in confrontation with the outer peripheral conical surface 18. A pair of horseshoe-shaped levers 50-1, 50-2 are interposed between the synchronizing ring 40 and the hub 22 and they are pressed and expanded in a radial direction by a spring 60 disposed to the inside thereof. The levers 50-1, 50-2 have lever heads 54-12, 54-22 projecting from the centers on the outer peripheries thereof. When the lever head 54-12 is taken as an example, a first taper edge 54-11 is formed thereto on a side opposite to the fifth speed gear 14-1 and a second taper edge 54-12 is formed thereto on the fifth speed gear 14-1 side. The inner peripheral spline 36 of the sleeve 28 has a tapered-square bracket shape corresponding to the taper edges 54-11, 54-12 and forms a taper surface 36-11 corresponding to the taper edge 54-11 and a taper surface 36-12 corresponding to the taper edge 54-12. The lever 50-2 shown below has a lever head 52-2 including the same structure as that of the lever head 52-1 of the lever 50-1 arranged as described above.

Figure 7:
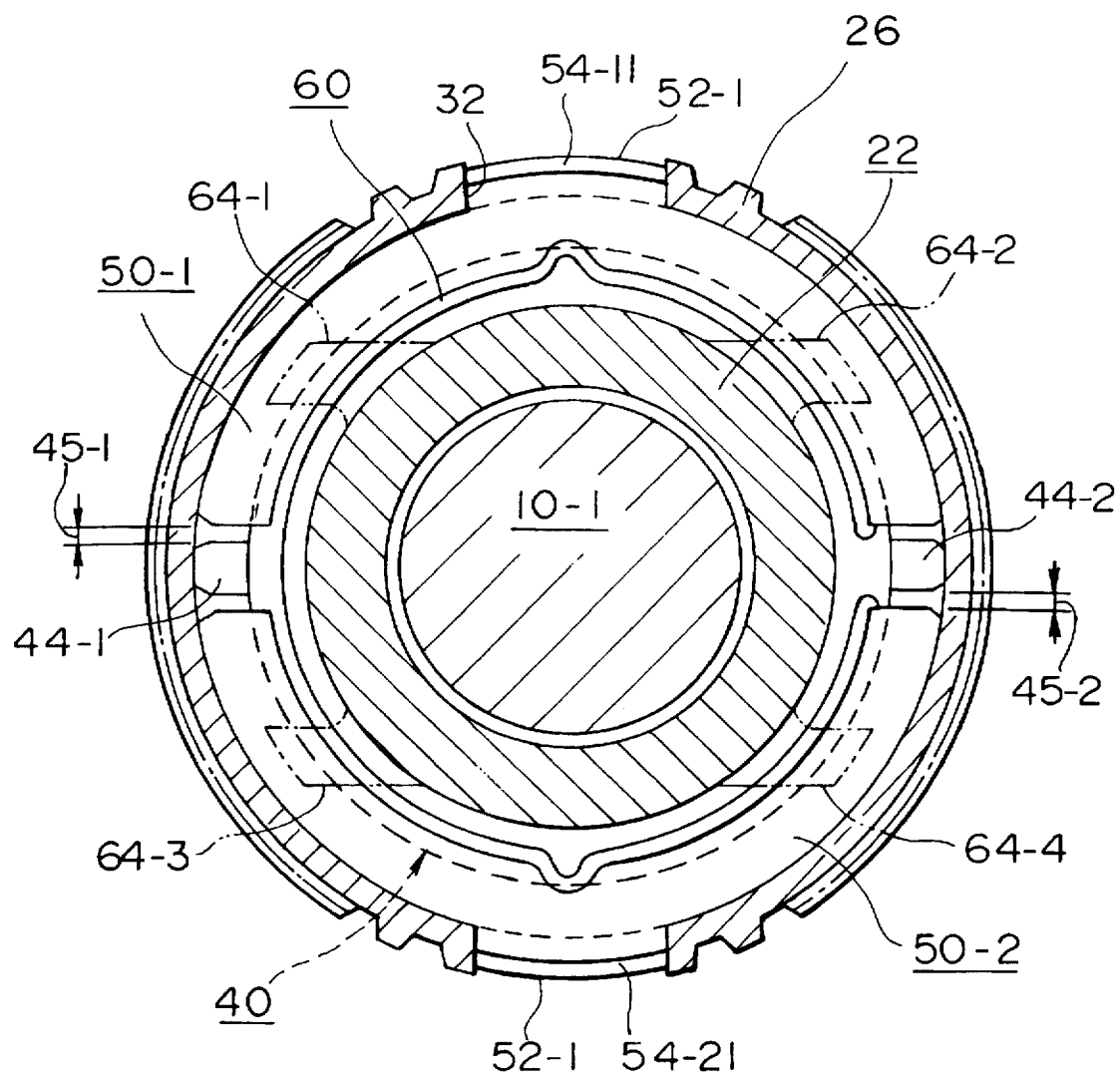
FIG. 7 is a cross sectional view taken along the line VII—VII of FIG. 6 without a sleeve.

FIG. 7 shows a cross sectional view taken along the line VII—VII of FIG. 6 without the sleeve 28. As apparent from FIG. 7, the semicircular levers 50-1, 50-2 are assembled to a ring-shaped recess between the hub 22 on the shaft mounting side thereof and the outer peripheral spline 26. Fulcrum projections 44-1, 44-2 projecting from an end surface of a synchronizing ring are located between both the ends of the levers 50-1, 50-2 and certain clearances 45-1, 45-2 are formed between the ends of the levers because the levers are pressed and expanded in the radial direction by the spring 60.

Figure 8:
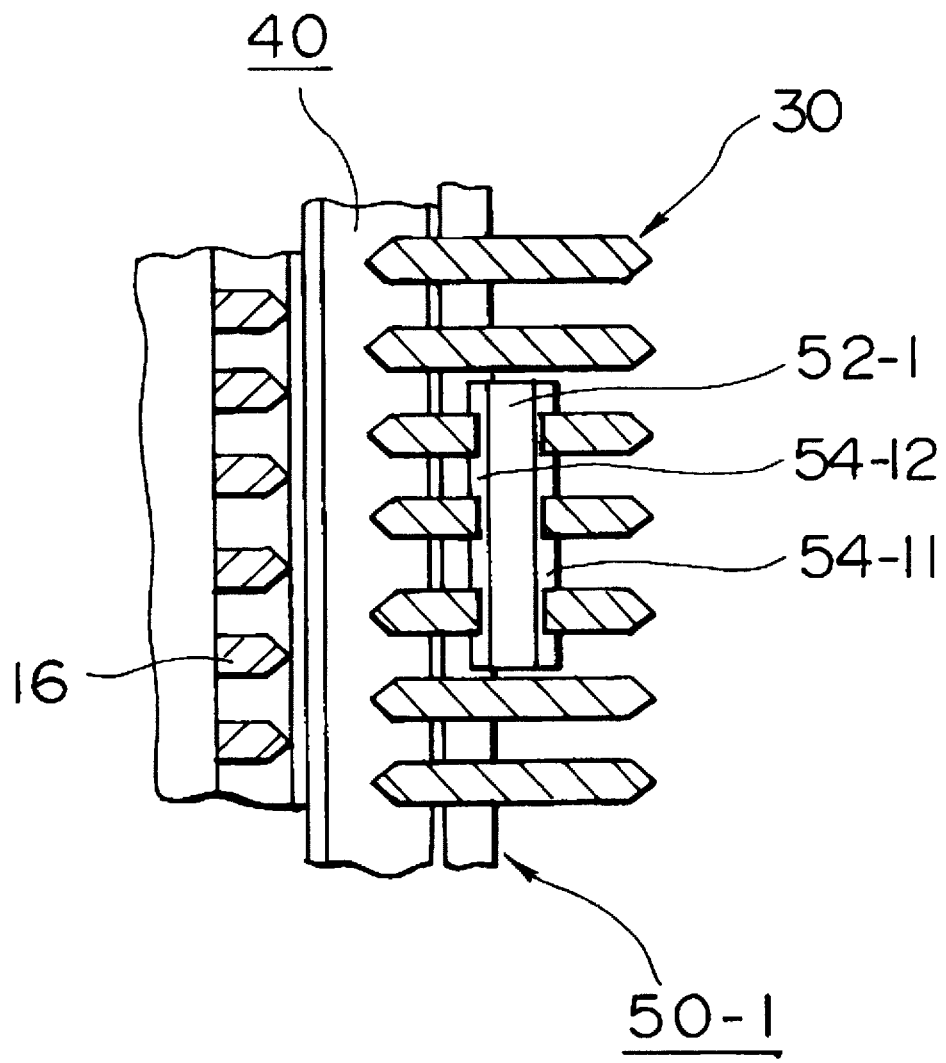
FIG. 8 is an expanded cross sectional view taken along the line VIII—VIII of FIG. 6 without a hub viewed from the outside.

FIG. 8 is an expanded cross sectional view taken along the line VIII—VIII of FIG. 6, in which the relationship between the inner peripheral spline 30 of the sleeve 28 and the lever head 52-1 of the lever 50-1 can be found. That is, since the outer peripheral spline 30 of the sleeve 28 corresponding to the lever head 52-1 projecting from the lever 50-1 is cut out, the first taper surface 36-11 is formed in correspondence to the first taper edge 54-11 on the right side of the lever head 52-1 and the second taper surface 36-12 is formed in correspondence to the second taper edge 54-12 on the left side thereof, respectively.

Figure 9:
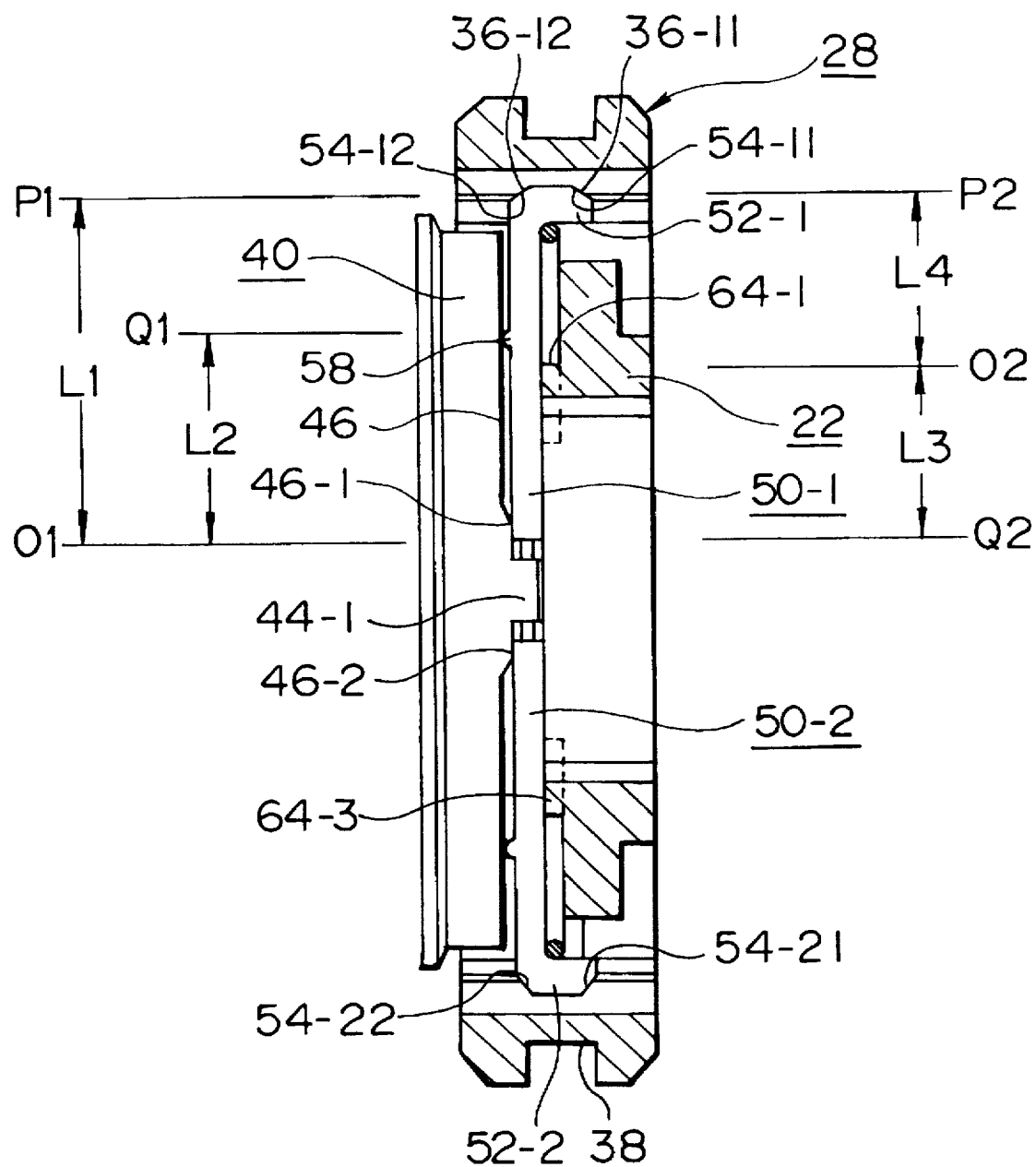
FIG. 9 is a view explaining the relationship between a synchronizing ring and a lever of FIG. 6.

FIG. 9 shows the hub 22 and sleeve 28 partly in cross section with respect to an outside view of the synchronizing ring 40. When the lever 50-1 is taken as an example, the first taper edge 54-11 against which the taper surface 36-11 of the inner peripheral spline 36 of the sleeve 28 is abutted forms a first effort in the booster mechanism of the synchronizing apparatus of the fifth speed gear. A first fulcrum is formed at a position where an end of the lever is abutted against the fulcrum projection 44-1 by the frictional contact of the lever 50-1 when synchronization is started. Further, a projection for point of application 58 disposed to the end surface of the lever 50-1 on the synchronizing ring 40 side thereof forms a point of application. Since the lever 50-2 on the lower side is arranged similarly to the above, a first effort is formed by the first taper edge 54-21 on the right side of the lever head 52-2 which presses the taper surface 36-11 of the sleeve 28, a first fulcrum is formed to a position where the end of the lever is abutted against the fulcrum projection 44-2 located on a side opposite to the fulcrum projection 44-1 (refer to FIG. 6), and a first point of application is formed at a position where the projection for point of application 58-2 is abutted against the end surface of the synchronizing ring 40. When it is supposed here that the first fulcrum position of the lever 50-1 is represented by Q1, the effort position thereof is represented by P1, and the point of application thereof is represented by Q1, a boost action shown by the following relation can be obtained likewise the above relation (2).

$$Fout\ 1 = Fin1 \times (L + 1/L2) \tag{3}$$

Next, the rearward synchronizing mechanism used when gear shift operation is executed to a side opposite to the fifth speed gear 14-1 will be described with reference to FIG. 6. The rearward synchronizing mechanism is disposed as an integral unit with the booster mechanism in the synchronizing apparatus of the fifth speed gear 14-1. First, when the lever 50-1 is taken as an example, the second taper edge 54-12 disposed to the lever head 52-1 on the fifth speed gear 14-1 side thereof and the taper surface 36-12 of the sleeve 28 confronting the second taper edge 54-12 are provided for rearward synchronization for stopping the rotation of the drive shaft 102 by causing the drive shaft 102 to be synchronized with the fifth speed gear 14-1 when the gear shift operation is executed to the side opposite to the fifth speed gear 14-1. As a result, when the sleeve 28 is moved to the side opposite to the fifth speed gear 14-1, a pressure force from the taper surface 36-12 is received by the second taper edge 54-12 of the lever head 52-1 and a pressure force to the side opposite to the fifth speed gear 14-1 is reversed to a pressure force of the fifth speed gear 14-1 by the lever 50-1 and applied to the synchronizing ring 40. As a mechanism for reversing the pressure force, expanding portions 64-1, 64-2 are disposed to the lever 50-1 from the end surface of the hub 26 on the shaft portion side thereof and expanding portions 64-3, 64-4 are disposed to the lever 50-2, as shown in FIG. 7. As apparent from the cross section of the hub 22 shown in FIG. 9, the expanding portions 64-1 to 64-4 are abutted against substantially the centers of the levers 50-1, 50-2 and the edge portions thereof are set as a second fulcrum position Q2 of the levers 50-1, 50-2. Further, the second taper edge 54-12 of the lever head 52-1 with respect to a second fulcrum position Q2 is set as a second position for point of application P2. Further, the side of the end of the lever 50-1 located on the lower side of the fulcrum position Q2 is set as a second position for point of application Q2 with respect to the synchronizing ring 40. The second point of application Q2 is realized by forming trapezoidal expanded portions 46-1, 46-2 on both the sides of the fulcrum projection 44-1 projecting from the end surface of the synchronizing ring 40.

When a pressure force applied to the second taper edge 54-12 of the lever 50-1 at the time the sleeve 28 is moved to a side opposite to the fifth speed gear 14-1 is represented by Fin2, a reversed pressure force applied to the point of application Q2 of the trapezoidal expanded portion 46-1 of the synchronizing ring 40 is represented by Four 2, a distance from the fulcrum position O2 to the second effort P2 is represented by L4 and a distance from the fulcrum position O2 to the second point of application Q2 is represented by L3, the following relation is established.

$$Fin2 \times L4 = Fout\ 2 \times L3. \tag{4}$$

Therefore, the reversed pressure force Fout 2 applied to the synchronizing ring 40 is represented by the following relation.

$$F_{out}\ 2 = F_{in}2 \times (L4/L3) \qquad (5)$$

When L3 is set to a value approximately equal to L4 here, the reversed pressure force Four 2 which is equal to the pressure force Fin2 resulting from the movement of the sleeve 28 can be applied to the synchronizing ring 40. When the synchronizing ring 40 is pressed by the pressure force reversed as described above, the inner peripheral conical surface 42 of the synchronizing ring 40 is pressed against and caused to come into frictional contact with the outer peripheral conical surface 18 of the fifth speed gear 14-1. Consequently, even if the drive shaft 102 is rotated by inertia when a clutch is disconnected in a reverse shift, the rotation of the drive shaft 102 is stopped by the synchronizing ring 40 which is in frictional contact with the stationary fifth speed gear 14-1, so that the reverse idler gear (not shown) can be meshed between the reverse drive gear and the reverse driven gear without causing gear noise.

Next, operation of the embodiment shown in FIG. 6 to FIG. 9 will be described. First, shift operation of the forward fifth speed gear 14-1 in FIG. 5 is the same as that of the embodiment of FIG. 1. That is, when a shift lever is shifted to the fifth speed gear, the sleeve 28 is moved leftward by a shift fork (not shown). Thus, the first taper edges 54-11, 54-21 disposed to the right side of the lever heads 52-1, 52-2 of the levers 50-1, 50-2 are axially pressed by the taper portion 36-11 of the inner peripheral spline 36 of the sleeve 28, so that synchronization is executed by frictional contact resulting from that the inner peripheral conical surface 42 of the synchronizing ring 40 is pressed against the outer peripheral conical surface 18 of the fifth speed gear 14-1 and the spline 36 of the sleeve 28 is meshed with the clutch gear 16 when the synchronization is completed to thereby complete the shift operation.

Figure 10:
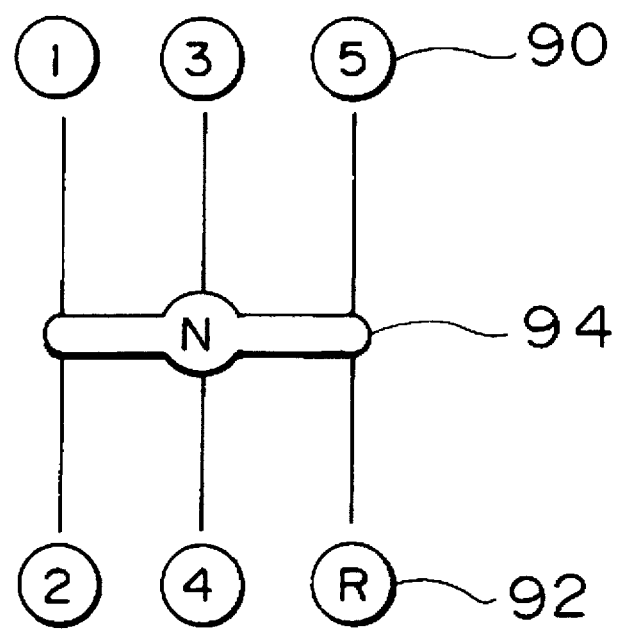
FIG. 10 is a view explaining a speed change pattern of a shift lever in a five-speed transmission.

Next, shift operation to the side opposite to the fifth speed gear 14-1 in a reverse shift will be described. Generally speaking, in the forward five-speed/rearward one-speed transmission, a shift pattern of a shift lever operated by a driver is arranged as shown in FIG. 10. A shift position 90 to a fifth speed is usually on the same row as that of a reverse shift position 92 and they are located on an opposite side with respect to a neutral position. Further, when shift operation is executed by disconnecting a clutch in the state that an automobile stops while rotating an engine, although the output shaft of the transmission on the drive shaft side thereof is stopped, a drive shaft on the engine side is rotated together with a clutch disk by inertia. Thus, unless the rotation of the input side drive shaft is stopped in the shift operation, a phenomenon called gear noise is caused when respective speed change gears are shifted to thereby generate uncomfortable gear mesh noise. It is an ordinary practice to provide a forward speed change gear with a synchronizing apparatus and not to provide a reverse speed change gear with a synchronizing apparatus. Thus, there is a high possibility of the occurrence of the gear noise when gear shift operation is executed to the reverse gear to drive an automobile rearward. It is known that the reverse shift can be executed without causing the gear noise in such a manner that gear shift operation is executed once to a forward fifth speed gear just before the reverse shift is executed by disconnecting the clutch and then the reverse shift is executed while the clutch is disconnected because the rotation of the input drive shaft is stopped by the action of the synchronizing apparatus of the forward fifth speed change gear. That is, when the rotation of the input side drive shaft is stopped by operating the synchronizing apparatus of the forward speed change gear by any method in the reverse shift, the reverse shift can be executed without causing gear noise. In the embodiment shown in FIG. 6–FIG. 9, the synchronizing apparatus disposed to the fifth speed gear 14-1-1 can be operated in association with reverse shift to prevent gear noise caused in the reverse shift.

In FIG. 6, when the shift lever is shifted from the neutral position 94 to the reverse position as shown in FIG. 10, the sleeve 28 is moved to the side opposite to the fifth speed gear 14-1 by the shift fork equipped with the shift mechanism. The movement of the sleeve 28 enables the taper surfaces 36-12, 36-22 of the inner peripheral spline 30 to press the second taper edges 54-12, 54-22 of the levers 50-1, 50-2 disposed on the hub 22 side in the axial direction. That is, when the lever 50-1 side of FIG. 9 is taken as an example, the axial pressure force Fin2 is applied to the second point of application P2 serving as the second taper edge 36-12 on the left side of the lever head 52-1 by the movement of the sleeve 28 to the side opposite to the fifth speed gear 14-1. As a result, the lever 52-1 turns clockwise on the edge of the expanded portion 64-1 on the end surface of the hub 22 as the second fulcrum position O2. As a result, the trapezoidal expanded portion 40-1 of the synchronizing ring 40 is pressed to the left side by the pressure force Fout 2 at the point of application Q2 at the loser end of the lever. Likewise, the lower lever 50-2 presses the synchronizing ring 40 in the left direction. Thus, the synchronizing ring 42 is pressed to the fifth speed gear 14-1 side and the inner peripheral conical surface 42 thereof is pressed against the outer peripheral conical surface 18 of the gear to thereby generate frictional contact in FIG. 5. If the drive shaft 10 is rotated together with the clutch disk by inertia at the time by the disconnection of the clutch, the rotation of the drive shaft 10 is stopped by the frictional contact of the synchronizing ring 40 with the outer peripheral conical surface 18 of the stationary fifth speed gear 14-1. When the sleeve 28 is further pressed to the side opposite to the fifth speed gear 14-1, the levers 50-1, 50-2 are forcibly inserted inside toward a center shaft against the spring 60, so that the not shown reverse idler gear can be smoothly meshed between the reverse drive gear and the reverse driven gear.

Figure 11:
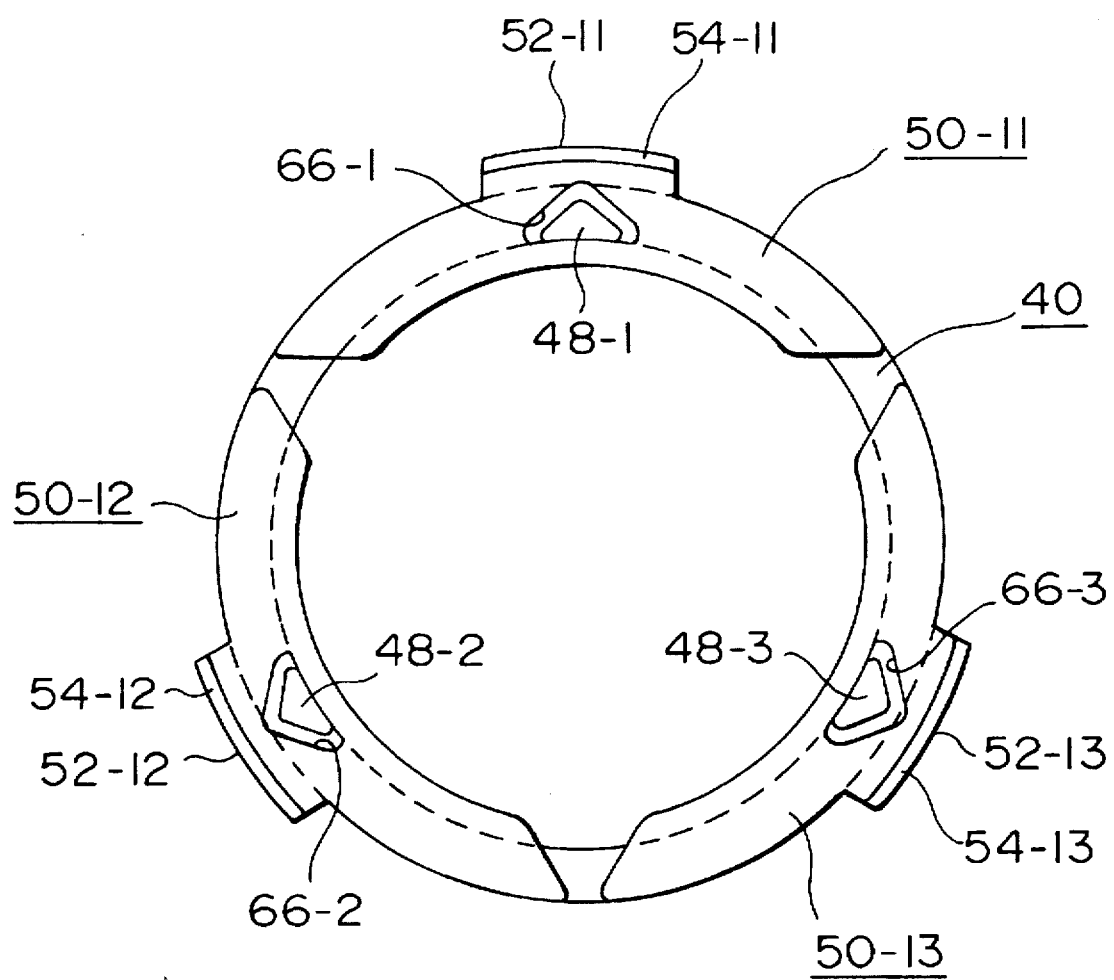
FIG. 11 is a view explaining a main portion of another embodiment of the synchronizing apparatus of the present invention equipped with a booster mechanism.

FIG. 11 shows another embodiment of the booster mechanism of the present invention used in the transmission of FIG. 2. FIG. 11 shows the synchronizing apparatus of FIG. 2 wherein a portion used in place of the levers 50-1, 50-2 disposed as the booster mechanism is shown together with a synchronizing ring 40. First, triangular fulcrum projections 48-1, 48-2 and 48-3 are disposed on the end surface of the synchronizing ring 40 at three positions in a peripheral direction and each of the projections has its apex positioned by facing in an outer peripheral direction. Levers 50-11 to 50-13, divided into three portions in the peripheral direction, are disposed to the respective fulcrum projections 48-1 to 48-3. The respective levers 50-11 to lever 50-13 form triangular holes 66-1, 66-2, 66-3 by the two sides on the apex sides and disposed through certain clearances with respect to the triangular fulcrum projections 48-1 to 48-3 of the synchronizing ring 40. These holes 66-1 to 66-3 are engaged with the fulcrum projections 48-1 to 48-3 of the synchronizing ring 40, respectively. Further, the levers 50-11 to 50-13 are pressed and expanded by a ring-shaped spring with a partially cut-out portion in a radial direction, so that certain clearances are formed between the fulcrum projections 48-1 to 48-3 and the two sides on the apex sides of the holes 66-1 to 66-3 at the initial state of the levers as shown in FIG. 11. Further, the respective levers 50-11 to 50-13 have lever heads 52-11, 52-12, 52-13 projecting from the centers on the outer peripheries thereof. These lever heads 52-11-52-13 are the same as the lever heads 52-1, 52-2 of the levers 50-1, 50-2 of FIG. 1 and include taper edges 54-11, 54-12, 54-13 for receiving the pressure force from the taper surface 36 of an inner peripheral spline 30.

When the synchronizing ring 40 and the levers 50-11 to 50-13 shown in FIG. 11 are assembled in place of the synchronizing ring 40 and the levers 50-1 to 50-2 of FIG. 2, a pressure force to the taper edges 52-11 to 52-13 can be boosted and applied to the synchronizing ring 40 at the time a sleeve 28 is moved to a second speed gear 14 in shift operation likewise the embodiment of FIG. 2. Further, since the taper edges are formed to both the edges of the respective lever heads 52-11 to 52-13 of the levers 50-11 to 50-13 of FIG. 11, likewise the lever heads 52-1, 52-2 of the levers 50-1, 50-2 of the embodiment of FIG. 6, a boost action when gear shift operation is executed to a fifth speed gear 14-1 and a rearward synchronizing action when gear shift operation is executed to a reverse gear 70 can be realized likewise.

Figure 12:
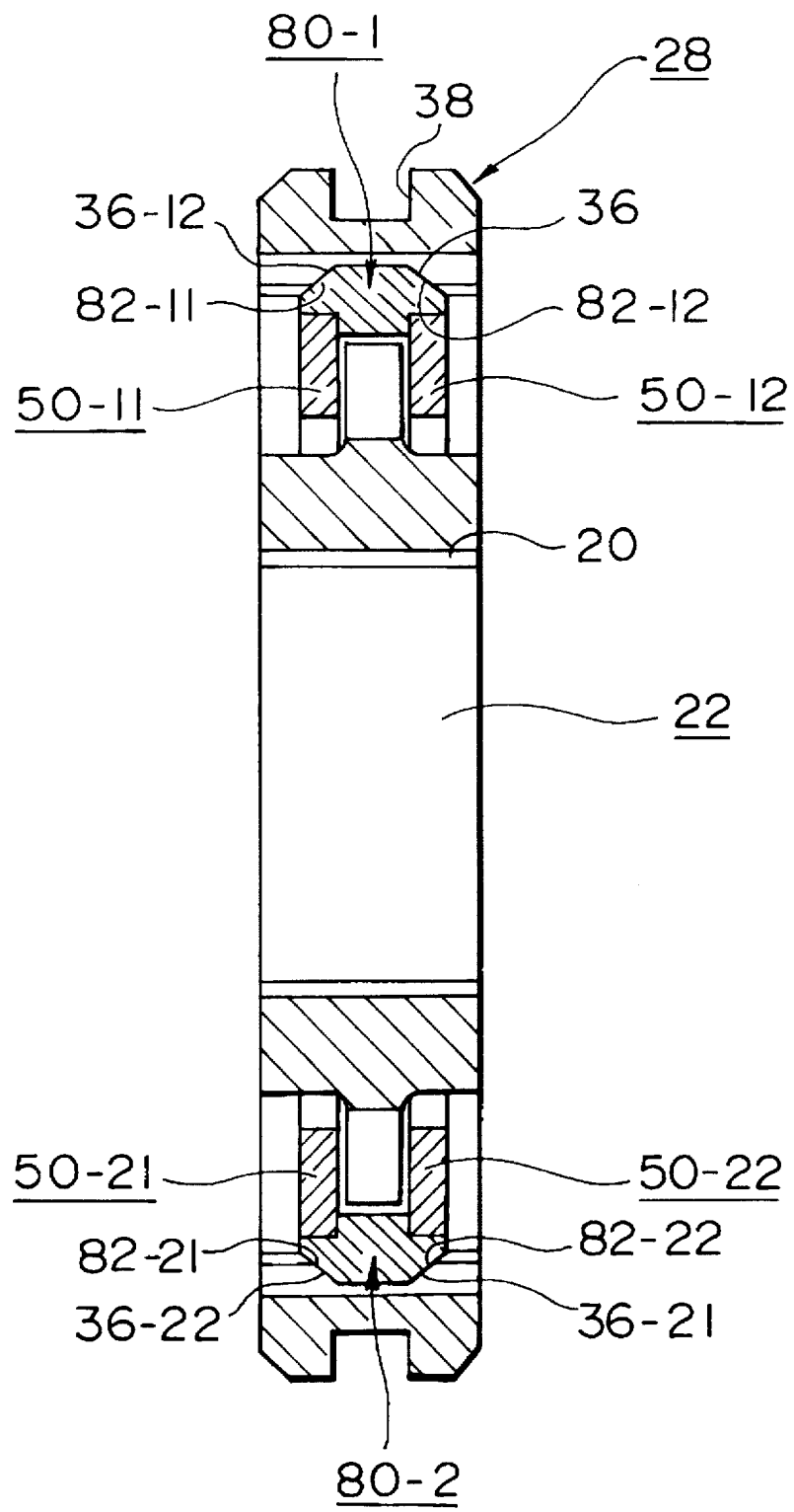
FIG. 12 is a cross sectional view of still another embodiment of the synchronizing apparatus of the present invention equipped with the booster mechanism.

FIG. 12 shows another embodiment of the synchronizing apparatus of the present invention. In FIG. 12, levers 50-1, lever 50-21 are disposed on the left side of the recess of a rib formed between the boss of a hub 22 through which the hub is mounted on an output shaft and an outer peripheral spline 26 and levers 50-12, 50-22 are disposed on the right side of the recess. Although the levers 50-11, 50-12 and the levers 50-21, 50-22 have a horseshoe-shape formed by being divided in a peripheral direction likewise the levers 50-1, 50-2 of FIG. 3, they have no taper edges 54-1, 54-2 and blocks 80-1, 80-2 are disposed in FIG. 12 in place of the taper edges 54-1, 54-2. When the blocks 80-1, 80-2 are described by taking the block 80-1 as an example, the block 80-1 includes taper edges 82-11, 80-12 corresponding to the taper edges 36-11, 36-12 formed to the inner peripheral spline 36 of the sleeve 28. Likewise, the block 80-2 equipped with the lower levers 50-21, 50-22 also have taper edges 82-21, 82-22 formed thereto which correspond to the taper surfaces 36-21, 36-22 formed to the inner peripheral spline 36 of the sleeve 28. Likewise, in the embodiment shown in FIG. 3, the levers 50-11, 50-12, 50-21, 50-22 are disposed a synchronizing ring 40 in such a manner that they are assembled on both the sides of fulcrum projections 44-1, 44-2 through clearances 45-1, 45-2 by being subjected to a pressure force in a radial direction caused by a spring 60. Further, a projection corresponding to the projection for point of application 58-1 serving as the point of application Q is disposed at a not shown position of the end surface of each of the levers 50-11, 50-12, 50-21, 50-22 on the speed change gear side thereof, that is, to the end surfaces thereof confronting the synchronizing ring on the respective speed change gear sides. In the synchronizing apparatus provided with a sixth structure of FIG. 12 as described above, a pressure force boosted by the movement of a shift lever can be applied to the synchronizing ring of the synchronizing apparatus in any case that a sleeve 28 is shifted to a left side speed change gear and to a right side speed change gear, so that a synchronizing performance can be increased.

Figure 13:
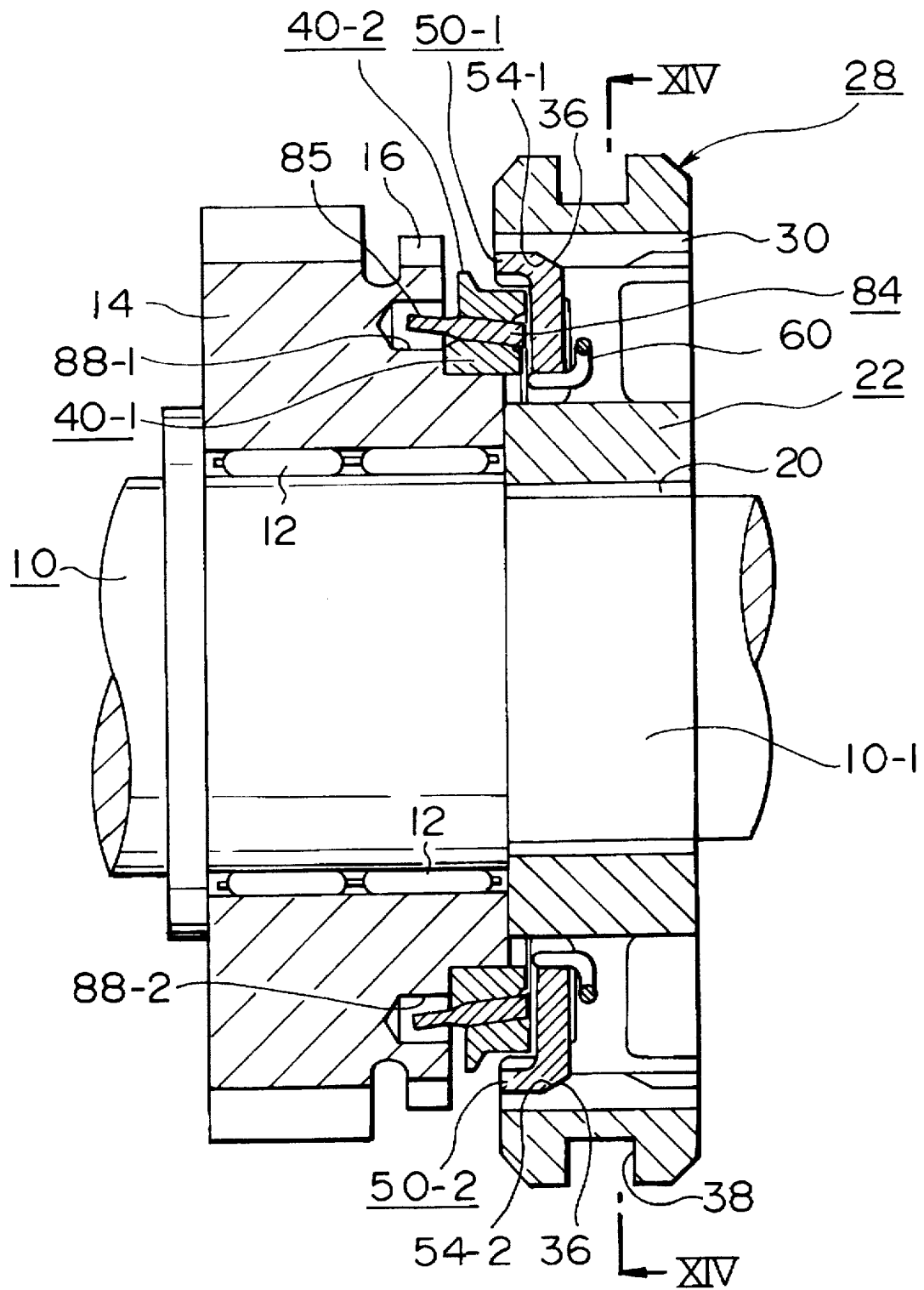
FIG. 13 is a cross sectional view of an embodiment of the present invention using a double synchronizing cone.

FIG. 13 shows another embodiment of the present invention having a synchronizing apparatus which is characterized in the employment of a double cone structure. In FIG. 13, the double cone structure is realized by a cone 84 which is disposed to the portion of a synchronizing ring continuous to the clutch 16 of a second speed gear 14 and located between a synchronizing outer ring 40-1 and a synchronizing inner ring 40-2. The cone 84 has a plurality of claws 85 projecting from the left side thereof in a peripheral direction and the claws 85 are engaged with holes 88-1, 88-2 formed to the end surface of the clutch gear 16. As a result, the cone 84 is movable in an axial direction and the rotational direction thereof is regulated with respect to a speed change gear 15.

Figure 14:
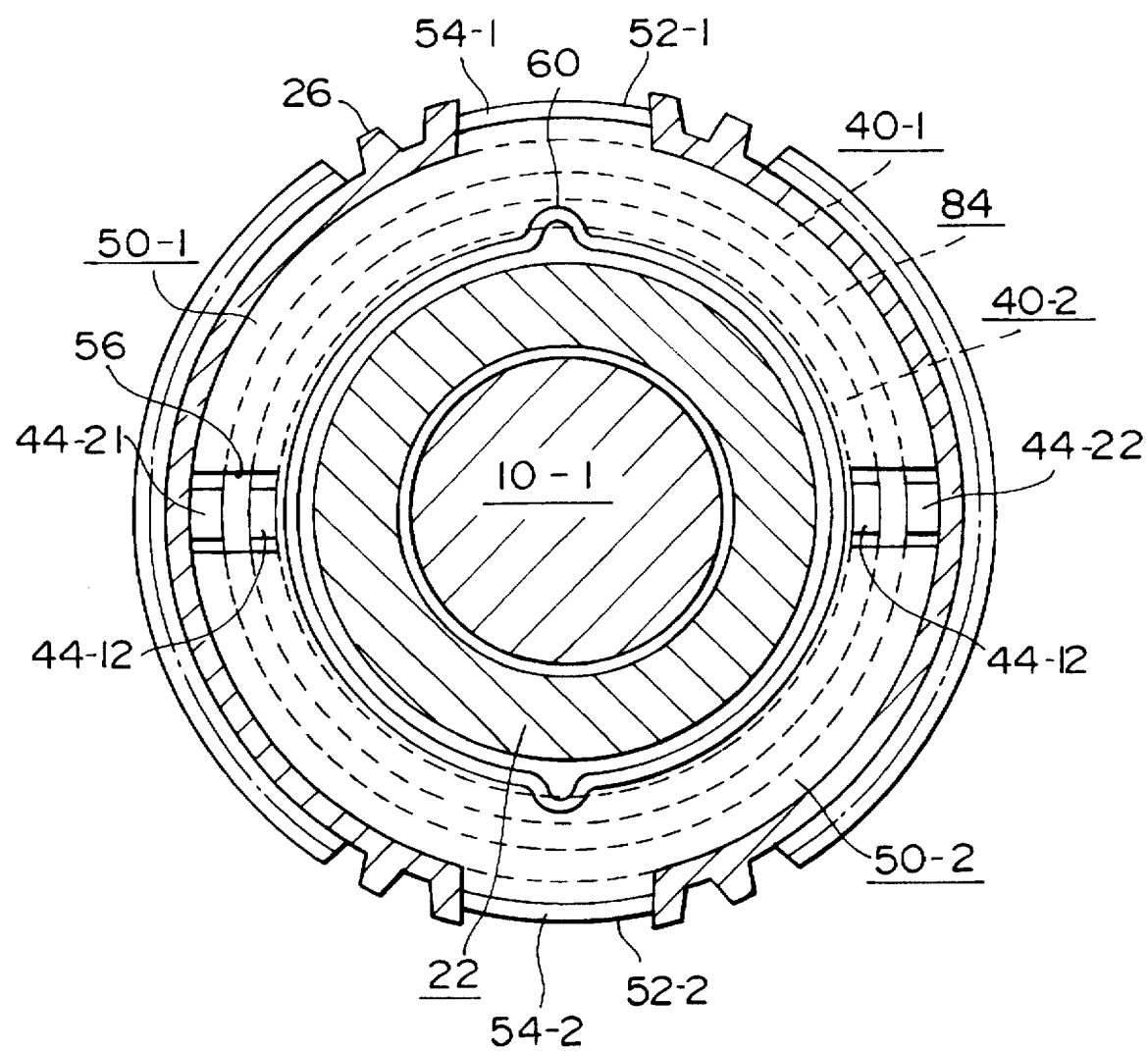
FIG. 14 is a cross sectional view taken along the line XIV—XIV of FIG. 13 without a sleeve.

FIG. 14 is a cross sectional view taken along the line XIV—XIV of FIG. 13 wherein a sleeve 28 is omitted. Fulcrum projections 44-11, 4-12 are formed to the end surfaces of the synchronizing inner ring 40-2 at the two positions thereof confronting each other in a radial direction, the synchronizing inner ring 40-2 being disposed to the inside of the cone 84 shown by a dashed line. Likewise, fulcrum projections 44-21, 44-22 are also formed to the synchronizing outer ring 40-2. Semicircular levers 50-1, 50-2 are assembled to the fulcrum projections 44-11, 44-12, 44-21, 4-22 through a certain clearance formed between an end of each of the levers and each of the projections in the state the levers are pressed and expanded in a radial direction by a spring disposed to the inside of them. The lever 50-1, lever 50-2 have lever heads 52-1, 52-2 likewise the embodiment of FIG. 3 and taper edges 54-1, 54-2 are formed to the portion where the sleeve 28 is abutted against the inner peripheral spline.

To describe operation of the embodiment of FIG. 13, when the sleeve 28 is moved to a second speed gear 14 side by shift operation, the taper edges 54-1, 54-2 of the levers 50-1, 50-2 are pressed in an axial direction by the taper surface 36 of the inner peripheral spline 30. This pressure force is boosted by the expanding action of the levers 50-1, 50-2 and presses the synchronizing outer ring 40-1 to the left side. As a result, the inner peripheral conical surface of the synchronizing outer ring 40-1 is pressed against and caused to come into contact with the outer peripheral conical surface of the cone 84 to thereby generate a frictional force and further the inner peripheral conical surface of the cone 84 is pressed against the outer peripheral conical surface of the synchronizing ring 40-2 and generates torque due to frictional contact. With this operation, the rotation of a hub 22 rotated by an output shaft 10 is followed by the rotation of the second speed gear 14 and when the rotations of them coincide with each other, the sleeve 28 presses the lever 50-1, lever 50-2 downward and is smoothly engaged with a clutch gear 16.

Note, in the above embodiments, although the taper surface of the inner circumferential spline of the sleeve 28 and the taper edges of the lever heads of the levers by which the booster mechanism of the synchronizing apparatus is realized are arranged as the direct taper surface as an example, they may be formed to a curved surface having a certain degree of a radius of curvature, respectively. Although the number of the levers used in the booster mechanism and the rearward synchronizing mechanism is set to the two or three levers as an example in the above embodiments, the number may be suitably determined as necessary. Further, the booster mechanism and the rearward synchronizing mechanism of the present invention may be suitably changed and modified within a range in which the functions of them are not damaged. Thus, for example, threads and oil grooves may be formed to the respective conical surface to increase frictional torque of the synchronizing apparatus and further the spring 60 may be formed to any shape other than the ring shape and disposed at any location.

What is claimed is:

1. A synchronizing apparatus for a transmission, said apparatus comprising:

an output shaft for outputting rotational power;

a hub secured to said output shaft and having a spline formed in an outer peripheral surface of said hub;

a sleeve having a spline formed in an inner peripheral surface of said sleeve, said sleeve being slidable in an axial direction upon insertion of said sleeve spline in said outer peripheral spline of said hub;

a speed change gear, pivotally mounted on said output shaft, having an outer peripheral conical surface on a hub side and an integrally formed clutch gear formed continuously from said outer peripheral conical surface, said clutch gear meshing with said inner peripheral spline of said sleeve upon axial movement thereof;

a synchronizing ring interposed between said sleeve and said outer peripheral conical surface of said speed change gear, said synchronizing ring having an inner peripheral conical surface confronting said outer peripheral conical surface of said speed change gear; and a booster mechanism interposed between said hub and said synchronizing ring, said booster mechanism being positioned so as to receive a pressure force caused by movement of said sleeve toward said speed change gear and thereby boosting and transmitting said pressure force to said synchronizing ring, wherein said booster mechanism comprises:

a pair of projections serving as fulcrums which project from at least two symmetrical positions of an end surface of said synchronizing ring on the hub side thereof;

a pair of levers, divided into at least two sections in a peripheral direction, disposed on both sides of said pair of projections of said synchronizing ring with a certain clearance in the peripheral direction, said levers come into contact with one side of said projections by a relative rotation of said synchronizing ring upon frictional contact of said speed change gear which is started in association with a movement of said sleeve such that said levers are pushed and widened in a radial direction;

a plurality of lever heads projecting from a center of an outer periphery of each of said pair of levers, respectively, and having a tapered edge forming an effort for receiving an axial pressure force caused by movement of said sleeve and decomposing said pressure force to a radial component force directed toward a center and an axial component force;

a portion for point of application which is provided by a contact point between said pair of levers and said synchronizing ring, said portion creating a point of application where said axial component force, made when a tapered edge provided on said inner peripheral spline of said sleeve is pressed against said tapered edge of said lever head, is boosted and acts on a predetermined position of an end surface of said synchronizing ring; and a plurality of fulcrum portions which are provided by contact points between said pair of levers forming fulcrums of said pair of levers for said point of application and a hub end surface, a distance L2 from said fulcrum to said point of application is set shorter than a distance L1 from said fulcrum to said effort, and an angle of said tapered edge is set such that when said inner peripheral conical surface of said synchronizing ring comes into frictional contact with said outer peripheral conical surface of said speed change gear, a reaction force applied from said projections to end surfaces of each of said levers overcomes a radial component force made by pressing said tapered edges of said lever heads provided with said pair of levers and that, until synchronization is completed, the depression of each of said levers to the inside in the radial direction is suppressed and the movement of said sleeve is blocked.

2. A synchronizing apparatus for transmission, comprising:

an output shaft for outputting rotational power;

a hub secured to said output shaft and having a spline formed in an outer peripheral surface of said hub;

a sleeve having a spline formed in an inner peripheral surface of said sleeve, said sleeve being slidable in an axial direction upon insertion of said sleeve spline in said outer peripheral spline of said hub;

a speed change gear, pivotally mounted on said output shaft, having an outer peripheral conical surface on a hub side and an integrally formed clutch gear formed continuously from said outer peripheral conical surface, said clutch gear meshing with said inner peripheral spline of said sleeve upon axial movement thereof;

a synchronizing ring interposed between said sleeve and said outer peripheral conical surface of said speed change gear, said synchronizing ring having an inner peripheral conical surface confronting said outer peripheral conical surface of said speed change gear; and a booster mechanism interposed between said hub and said synchronizing ring, said booster mechanism being positioned so as to receive a pressure force caused by movement of said sleeve toward said speed change gear and thereby boosting and transmitting said pressure force to said synchronizing ring, wherein said booster mechanism comprises:

a plurality of triangular projections spaced at equal intervals on an end surface of said synchronizing ring, each of said triangular projections having an apex projecting in an outer peripheral direction on the hub side thereof;

a plurality of levers divided into a plurality of sections in a peripheral direction, each of said levers forming a triangular hole disposed through a certain clearance, and said triangular holes being disposed relative to said plurality triangular projections;

a plurality of lever heads each projecting from a center of an outer periphery of each of said plurality of levers and having a tapered edge forming an effort for receiving an axial pressure force caused by movement of said sleeve and decomposing said pressure to a central radial component force and an axial component force; and a projection for point of application formed on each of the pair of said levers and creating a point of application wherein said axial component force, made by pressing the effort of said lever head, is boosted and transmitted to a predetermined position of said end surface of said synchronizing ring.

3. A synchronizing apparatus for a transmission, said apparatus comprising:

an output shaft for outputting rotational power;

a hub secured to said output shaft and having a spline formed in an outer peripheral surface of said hub;

a sleeve having a spline formed in an inner peripheral surface of said sleeve, said sleeve being slidable in an axial direction upon insertion of said sleeve spline in said outer peripheral spline of said hub;

a speed change gear, pivotally mounted on said output shaft, having an outer peripheral conical surface on a hub side and an integrally formed clutch gear formed continuously from said outer peripheral conical surface, said clutch gear meshing with said inner peripheral spline of said sleeve upon axial movement thereof;

a synchronizing ring interposed between said sleeve and said outer peripheral conical surface of said speed change gear, said synchronizing ring having an inner peripheral conical surface confronting said outer peripheral conical surface of said speed change gear, wherein said synchronizing ring has a double cone structure including a cone interposed between a synchronizing outer ring and a synchronizing inner ring; and a booster mechanism interposed between said hub and said synchronizing ring, said booster mechanism being positioned so as to receive a pressure force caused by movement of said sleeve toward said speed change gear and thereby boosting and transmitting said pressure force to said synchronizing ring, wherein said booster mechanism comprises:

a plurality of projections which project to at least two symmetrical positions of the end surface of each of said synchronizing outer ring and said synchronizing inner ring on the hub side thereof;

a pair of levers divided into at least two sections in a peripheral direction and disposed on both the sides of said plurality of said projections through a certain clearance;

a plurality of lever heads, each of said lever heads projecting from a center of an outer periphery of each of said pair of levers and having a tapered edge forming an effort for receiving an axial pressure force caused by movement of said sleeve and decomposing said pressure force into a central radial component force and an axial component force; and a projection for point of application formed to each of said levers and creating a point of application where said axial component force, made by pressing the effort of said lever head, is boosted and transmitted to a predetermined position of the end surface of said synchronizing outer ring.

4. A synchronizing apparatus for a transmission, said apparatus comprising:

a drive shaft to which rotational power is input;

a hub secured to said drive shaft and having a spline formed in an outer peripheral surface thereof;

a sleeve having a spline formed in an inner peripheral surface of said sleeve, said sleeve being slidable in an axial direction upon insertion of said sleeve spline in said outer peripheral spline of said hub;

a forward speed change gear, pivotally mounted on said output shaft on one side thereof relative to said hub, having an outer peripheral conical surface on a hub side and an integrally formed clutch gear formed continuously from said outer peripheral conical surface, said clutch gear meshing with said inner peripheral spline of said sleeve upon axial movement thereof;

a synchronizing ring interposed between said sleeve and said outer peripheral conical surface of said forward speed change gear, said synchronizing ring having an inner peripheral conical surface confronting said outer peripheral conical surface of said forward speed change gear; and a booster mechanism interposed between said hub and said synchronizing ring, said booster mechanism being positioned so as to receive a pressure force caused by movement of said sleeve toward said forward speed change gear and thereby boosting and transmitting said pressure force to said synchronizing ring; and a rearward synchronizing mechanism for stopping rotation of said drive shaft by a synchronizing action executed in such a manner that when said booster mechanism receives a pressure force caused by the movement of said sleeve to a side opposite to said forward speed change gear, said rearward synchronizing mechanism reverses and transmits said pressure force to said synchronizing ring, wherein said booster mechanism comprises:

a pair of projections projecting from at least two symmetrical positions of the end surface of said synchronizing ring on the hub side thereof;

a pair of levers, divided into at least two sections in a peripheral direction, disposed on both sides of said pair of projections of said synchronizing ring through a certain clearance in the peripheral direction, said pair of levers come into contact with one side of said projections by a relative rotation of said synchronizing ring upon frictional contact of said speed change gear which is started in association with a movement of said sleeve, and said pair of levers are pushed and widened in a radial direction;

a plurality of lever heads projecting from a center of the outer periphery of said pair of levers, respectively, and each of said lever heads a first tapered edge forming a first effort receiving an axial pressure force caused by movement of said sleeve and decomposing said pressure force to a central radial component force and an axial component force is provided for an edge of said rearward speed change gear side;

a first portion for point of application which is provided by a contact point between said pair of levers and said synchronizing ring and creates a first point of application where said axial component force which is made by pressing said first effort when a tapered edge provided on an inner peripheral spline of said sleeve is pressed to a tapered edge of said lever head is boosted and is acted on a predetermined position of the end surface of said synchronizing ring; and first fulcrum portions which are provided by contact points between said pair of levers forming first fulcrums of said pair of levers for said first point of application and said hub end surface, and said booster mechanism sets an angle of said first taper edge in a manner such that when the inner peripheral conical surface of said synchronizing ring comes into frictional contact with the outer peripheral conical surface of said speed change gear, a reaction force applied from said pair of projections to the end surface of each of said levers overcomes a radial component force made by pressing the first tapered edges of said lever heads provided with the pair of said levers and that until the synchronization is completed, the depression of each of said levers to the inside in the radial direction is suppressed and the movement of said sleeve is blocked; and said rearward synchronizing mechanism comprises:

a second tapered edge formed on the edge of said lever head on the forward speed change gear side thereof and forming a second effort for receiving a pressure force caused by the movement of said sleeve to a side opposite to said forward speed changing gear; and a fulcrum projection formed on the end surface of said hub for creating a second fulcrum which reverses and acts on an axial pressure force applied to the second effort of said second tapered edge from the second point of application of the end of each of said levers to said synchronizing ring.

5. A synchronizing apparatus for transmission, comprising:

a drive shaft to which rotational power is input;

a hub secured to said drive shaft and having a spline formed in an outer peripheral surface thereof;

a sleeve having a spline formed in an inner peripheral surface of said sleeve, said sleeve being slidable in an axial direction upon insertion of said sleeve spline in said outer peripheral spline of said hub;

a forward speed change gear, pivotally mounted on said output shaft on one side thereof relative to said hub, having an outer peripheral conical surface on a hub side and an integrally formed clutch gear formed continuously from said outer peripheral conical surface, said clutch gear meshing with said inner peripheral spline of said sleeve upon axial movement thereof;

a synchronizing ring interposed between said sleeve and said outer peripheral conical surface of said forward speed change gear, said synchronizing ring having an inner peripheral conical surface confronting said outer peripheral conical surface of said forward speed change gear; and a booster mechanism interposed between said hub and said synchronizing ring, said booster mechanism being positioned so as to receive a pressure force caused by movement of said sleeve toward said forward speed change gear and thereby boosting and transmitting said pressure force to said synchronizing ring; and a rearward synchronizing mechanism for stopping rotation of said drive shaft by a synchronizing action executed in such a manner that when said booster mechanism receives a pressure force caused by movement of said sleeve to a side opposite to said forward speed change gear, said rearward synchronizing mechanism reverses and transmits said pressure force to said synchronizing ring, wherein said booster mechanism comprises:

a plurality of triangular projections spaced at equal intervals on an end surface of said synchronizing ring, each of said triangular projections having an apex projecting in an outer peripheral direction on the hub side thereof;

a plurality of levers divided into a plurality of sections in a peripheral direction, each of said levers forming a triangular hole disposed through a certain clearance, and said triangular holes being disposed relative to said plurality of triangular projections;

a plurality of lever heads each of which projects from the center of the outer periphery of each of the plurality of said levers and in each of which a first tapered edge forming a first effort for receiving an axial pressure force caused by movement of said sleeve and decomposing said pressure force to a central radial component force and an axial component force is provided for an edge of said rearward speed change gear side;

a first projection for point of application formed to each of said plurality of levers and creating a first point of application where said axial component force made by pressing the first effort of said lever head is boosted and transmitted to a predetermined position of the end surface of said synchronizing ring; and first fulcrum portions which are provided by contact points between said plurality of levers forming first fulcrums of said plurality of levers for said first point of application and said hub end surface, wherein said rearward synchronizing mechanism comprises:

a second tapered edge formed to the edge of said lever head on the forward speed change gear side thereof and forming a second effort for receiving a pressure force caused by the movement of said sleeve to a side opposite to said forward speed changing gear; and a fulcrum projection formed on the end surface of said hub for creating a second fulcrum which reverses and transmits an axial pressure force applied to the second effort of said second tapered edge from the second point of application of the end of each of said levers to said synchronizing ring.

* * * * *